United States Patent
Ogata et al.

(10) Patent No.: US 7,924,676 B2
(45) Date of Patent: Apr. 12, 2011

(54) MULTILAYER INFORMATION RECORDING MEDIUM, INFORMATION RECORDER, AND INFORMATION REPRODUCER

(75) Inventors: Tetsuya Ogata, Kanagawa (JP); Kenya Yokoi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1033 days.

(21) Appl. No.: 11/597,434

(22) PCT Filed: May 23, 2005

(86) PCT No.: PCT/JP2005/009377
§ 371 (c)(1),
(2), (4) Date: Apr. 13, 2007

(87) PCT Pub. No.: WO2005/117005
PCT Pub. Date: Dec. 8, 2005

(65) Prior Publication Data
US 2007/0230308 A1  Oct. 4, 2007

(30) Foreign Application Priority Data

May 25, 2004 (JP) .................... 2004-154629
Mar. 7, 2005 (JP) .................... 2005-062091

(51) Int. Cl.
G11B 7/00 (2006.01)
G11B 7/24 (2006.01)
(52) U.S. Cl. ............... 369/94; 369/275.4; 369/44.26; 369/44.29
(58) Field of Classification Search ............ 369/94, 369/275.4, 275.2, 44.27, 44.29, 44.37, 44.26
See application file for complete search history.

(56) References Cited

U.S. PATENT DOCUMENTS

| | | | | |
|---|---|---|---|---|
| 5,677,903 A | * | 10/1997 | Holtslag et al. | 369/94 |
| 5,726,970 A | | 3/1998 | Kaneko et al. | |
| 5,732,065 A | * | 3/1998 | Braat et al. | 369/275.1 |
| 5,959,961 A | * | 9/1999 | Matsui | 369/275.1 |
| 5,974,009 A | * | 10/1999 | Tamura et al. | 369/44.29 |
| 6,069,868 A | | 5/2000 | Kashiwagi | |
| 6,071,588 A | | 6/2000 | Nobumasa et al. | |
| 6,175,548 B1 | | 1/2001 | Kashiwagi | |
| 6,434,095 B1 | | 8/2002 | Nishiuchi et al. | |
| 6,625,099 B2 | * | 9/2003 | Nakano | 369/94 |
| 6,738,322 B2 | * | 5/2004 | Amble et al. | 369/44.27 |
| 7,502,309 B2 | * | 3/2009 | Komaki et al. | 369/275.4 |
| 2002/0181352 A1 | * | 12/2002 | Saimi et al. | 369/94 |
| 2003/0133391 A1 | * | 7/2003 | Holtslag et al. | 369/94 |
| 2003/0214898 A1 | | 11/2003 | Ogata et al. | |
| 2004/0033328 A1 | * | 2/2004 | Yamaguchi | 428/64.4 |

(Continued)

FOREIGN PATENT DOCUMENTS

JP       03-265819       11/1991
(Continued)

*Primary Examiner* — Thang V Tran
(74) *Attorney, Agent, or Firm* — Dickstein Shapiro LLP

(57) ABSTRACT

A multi-layered information recording medium used in an information recording/reproducing apparatus applicable to both a single-layer information recording medium and an arbitrary multi-layered information recording medium is provided. The multi-layered information recording medium has a plurality of recording layers, and each of the recording layers has a guiding groove formed at a track pitch defined as a quadratic function of disk thickness (i.e., the distance from the light incident surface) of the associated recording layer. The guiding grooves of the recording layers are formed such that the track pitch of a reference recording layer having a disk thickness closest to that of the single-layer information recording medium is the smallest amongst the multiple recording layers.

30 Claims, 14 Drawing Sheets

U.S. PATENT DOCUMENTS

| | | |
|---|---|---|
| 2004/0105381 A1 | 6/2004 | Sabi |
| 2005/0122879 A1 | 6/2005 | Hirai et al. |
| 2005/0174918 A1 | 8/2005 | Ogata |
| 2008/0130458 A1* | 6/2008 | Shiono et al. .................. 369/94 |

FOREIGN PATENT DOCUMENTS

| | | |
|---|---|---|
| JP | 05-266511 | 10/1993 |
| JP | 8-255374 | 10/1996 |
| JP | 10-269630 | 10/1998 |
| JP | 11-16207 | 1/1999 |
| JP | 2001-216655 | 8/2001 |
| JP | 2002-352469 | 12/2002 |
| JP | 2003-091822 | 3/2003 |
| JP | 2003-281779 | 10/2003 |
| JP | 2003-346379 | 12/2003 |
| JP | 2004-145915 | 5/2004 |
| WO | WO 03/065359 A1 | 8/2003 |

* cited by examiner

MULTILAYER INFORMATION RECORDING MEDIUM, INFORMATION RECORDER, AND INFORMATION REPRODUCER

FIELD OF THE INVENTION

The present invention relates to a multi-layered structure of a multi-layered information recording medium (including a double-layered information recording medium), as well as to an information recording apparatus and an information reproducing apparatus for recording and reproducing information in and from the recording medium, respectively.

BACKGROUND ART

Multi-layered information recording media are known as media capable of storing a large number of information items. Currently, double-layered DVD-ROM (video format) and double-layered DVD+R are standardized and put into practical use as multi-layered recording information media.

FIG. 1 illustrates a general structure of a double-layered DVD+R. The double-layered DVD+R structure includes a first substrate 1, a semi-transmissive layer (L0) 2, an intermediate layer 3, a reflective metal film (L1) 4, and a second substrate 5, arranged in this order from the light incident surface.

In FIG. 1, information signals are recorded as patterns of specific shapes in the surface of the semi-transmissive layer 2 or the reflective metal film 4. The first substrate 1 and the second substrate 5 are generally made of polycarbonate. The intermediate layer 3 is generally made of an ultraviolet-curable or thermal-curable resin. The semi-transmissive layer 2 is made of, for example, silicon, silver, or aluminum. The reflective metal film 4 is made of silver or aluminum as a major constituent.

Because the disk thickness (the distance from the light incident surface to the recording layer) is different between a single-layer DVD+R and a double-layered DVD+R, both of which enable a user to read and write data in the disks, spherical aberration is generated. In addition, because the track pitch is the same in the respective recording layers in the double-layered information recording medium illustrated in FIG. 2A and in the single-layer information recording medium, data recording quality and data reproduction quality are degraded when the same optical system is used without aberration correction means.

To overcome the latter problem, optical systems with spherical aberration correcting elements have been developed in order to eliminate the variation in the recording quality and the data reproduction quality between the single-layer information recording media and double-layered information recording media. For example, Patent-related Publication 1 listed below discloses a technique for correcting spherical aberration by driving lenses other than the objective lens to change the optical magnification incident on the objective lens. Patent-related Publication 2 discloses a technique for correcting spherical aberration by shifting the phase of the light beam incident on the objective lens making use of the difference in refractive index of liquid crystal.

Patent-related Publications 3-5 listed below disclose a technique for improving the initial accessing speed by allowing the spherical aberration correcting element to be perceived at the same position between a single-layer information recording medium and a double-layered information recording medium when these information recording media are set in a recording apparatus using the above-described spherical aberration correcting techniques.

All of these known techniques are based upon the idea of making the recording layer of an information recording medium be consistent with the location of the recording layer of either a single-layer information recording medium or a double-layered information recording medium.

In recent years and continuing, there is a strong demand for further improvement in the reading and writing speed with respect to information recording media. It is also required for information recording media to have a structure for allowing high-speed access not only in the initial access speed, but also in the overall read/write speed. One method for reducing the read/write speed is to reduce the time required for inter-layer jumping (for allowing the focal spot of the light beam to jump between recording layers) during the reading and/or writing operations.

With the conventional techniques, inter-layer jump requires longer time because the spherical aberration correcting element has to be moved along with the shift of the focal spot of the objective lens. To overcome this problem, Patent-related Publication 6 proposes not to use a spherical aberration correcting element, and instead, it proposes to change the information items (including the track pitch and the minimum mark length) recorded in each of the recording layers linearly with respect to the disk thickness of that recording layer, based on the relationship between the degradation of the spot size due to the difference in the disk thickness, and the information density relative to the spot size, in order to enable high-speed access and to maintain the signal quality the same in the respective recording layers.

<Publications Referred to in the Specification>
 Patent-related Publication 1: JP 05-266511 A
 Patent-related Publication 2: JP 2,895,150 B
 Patent-related Publication 3: JP 2002-352469 A
 Patent-related Publication 4: JP 2003-281779 A
 Patent-related Publication 5: JP 2003-346379 A
 Patent-related Publication 6: JP 11-16207 A
 Patent-related Publication 7: JP 2003-91822 A Problem to be Solved However, it has been recently found that in the next-generation high-dense information recording media (using, for example, a 405-nanometer light source) signal degradation in reproduced signals is due to fluctuation in the optical resolution caused by aberration degradation, rather due to expansion of the spot size caused by aberration degradation. This is because the ratio of track pitch to spot size and the ratio of minimum mark length (minimum pit size) to spot size become smaller, as indicated in Table 1, and because the amount of information per unit size of spot increases.

TABLE 1

| STANDARD | CONVENTIONAL RECORDING MEDIUM | | HIGH-DENSE RECORDING MEDIUM | | MULTI-LEVEL RECORDING |
|---|---|---|---|---|---|
| | CD | DVD | Blu-ray | HD-DVD | |
| WAVELENGTH | 785 | 660 | 400~420 | | |
| SPOT SIZE | 1.49 | 0.87 | 0.41 | 0.54 | 0.54 |
| TRACK PITCH | 1.600 | 0.740 | 0.320 | 0.340 | 0.450 |
| MINIMUM MARK LENGTH | 0.833 | 0.400 | 0.149 | 0.173 | 0.240 |

TABLE 1-continued

| | CONVEN-TIONAL RECORDING MEDIUM | | HIGH-DENSE RECORDING MEDIUM | | |
|---|---|---|---|---|---|
| STANDARD | CD | DVD | Blu-ray | HD-DVD | MULTI-LEVEL RECORDING |
| (TRACK PITCH)/ (SPOT SIZE) | 1.07 | 0.85 | 0.78 | 0.63 | 0.84 |
| (MIN. MARK LENGTH)/ (SPOT SIZE) | 0.56 | 0.46 | 0.36 | 0.32 | 0.45 |

If the amount of information is increased by increasing the number of recording layers in the high-dense information recording media, the optical resolution changes greatly due to the spherical aberration caused by the variation (or the error) in the disk thickness, over the degradation of the spot size. For this reason, it is desired to realize a multi-layered information recording medium that serves as a high-density optical disk and enables preventing degradation of reproduced signals. It is also desired to realize an information recording apparatus suitable for and capable of writing data in such a multi-layered information recording medium so as to reduce the degradation when the recorded signals are reproduced.

The present invention was conceived in view of the above-described circumstances, and it is an object of the invention to provide a high-density and large-capacity multi-layered information recording medium that can reduce the inter-layer jumping time and can maintain the signal qualities of the respective recording layers substantially the same as that of a single-layer information medium. It is also an object of the invention to provide a small-sized information recording apparatus and a small-sized information reproducing apparatus suitable for recording and reproducing data in and from such a multi-layered information recording medium.

Means for Solving the Problem

To achieve the objects, in one aspect of the invention, the track pitch of each of the recording layers of a multi-layered information recording medium is determined by a quadratic function of distance from the light incident surface to the associated one of the recording layers (which distance is referred to as a "disk thickness").

To be more precise, a multi-layered information recording medium used in an information recording/reproducing apparatus applicable to both a single-layer information recording medium having a single recording layer on one side of that medium and an arbitrary multi-layered information recording medium having multiple recording layers on one side of that medium is provided. This multi-layered information recording medium includes:
(a) multiple recording layers, each recording layer having a guiding groove formed at a track pitch defined as a quadratic function of disk thickness of the associated recording layer, wherein
(b) the track pitch of the guiding groove of a reference recording layer that has a disk thickness closest to that of the single-layer information recording medium is the smallest amongst the multiple recording layers.

In a preferred example, if an optical system having a wavelength of 400 nm to 420 nm and an objective lens with a NA value of 0.63 to 0.67 is used, then the track pitch Pi satisfies $$1.9 \times 10^{-5} \times (di-600)^2 + 0.45 \leq Pi \qquad (1)$$

where di denotes the disk thickness of each of the recording layers.

In another example, the guiding groove of each of the recording layers is a spiral groove, and the track pitch of the spiral groove is determined such that the track pitch increases as the separation of the associated recording layer from the reference recording layer having the disk thickness closest to that of the single-layer information recording medium increases.

In still another example, the track pitches TPm and TPn of two adjacent recording layers (the m-th recording layer and the n-th recording layer) satisfy $$\left| \frac{TPm - TPn}{TPm} \right| \geq 0.043 \qquad (2)$$

In yet another example, the track pitch of the guiding groove formed in each of the recording layers is set so as to achieve an optical resolution equivalent to the optical resolution (i.e., modulation transfer function: MTF) of the light spot in the radial direction of the recording layer of the single-layer information recording medium.

In the second aspect of the invention, the minimum mark length of a recording mark formed in each of the recording layer of a multi-layered information recording medium is determined by a quadratic function of the distance from the light incident surface to the associated recording layer (i.e., the disk thickness).

To be more precise, the multi-layered information recording medium used in an information recording/reproducing apparatus applicable to both a single-layer information recording medium and an arbitrary multi-layered information recording medium includes:
(a) multiple recording layers, each recording layer having a guiding groove and recording marks formed in the guiding groove such that the minimum mark length is a quadratic function of the disk thickness of the associated recording layer, wherein
(b) the minimum mark length of the recording marks of the reference recording layer that has the disk thickness closest to that of the single-layer information recording medium is the smallest amongst the multiple recording layers.

In a preferred example, if an optical system having a wavelength of 400 nm to 420 nm and using an objective lens with a NA value of 0.63 to 0.67 is used, then the minimum mark length Si satisfies $$1.14 \times 10^{-5} \times (di-600)^2 + 0.24 \leq Si \qquad (3)$$

where di denotes the disk thickness of each of the recording layers.

In another example, the guiding groove of each of the recording layers is a spiral groove, and the recording marks are formed in the spiral groove in such a manner that the minimum mark length increases as the separation of the associated recording layer from the reference recording layer increases.

In still another example, the minimum mark lengths Dm and Dn of two adjacent recording layers (the m-th recording layer and the n-th recording layer) satisfy $$\left|\frac{Dm - Dn}{Dm}\right| \geq 0.048 \quad (4)$$

In yet another example, the recording marks are formed based on the minimum mark length determined so as to achieve an optical resolution equivalent to the optical resolution (MTF) of the light spot in the tangential (data writing) direction of the recording layer of a single-layer information recording medium.

The multi-layered information recording medium may have the features of both of the above-described first and second aspects. In this case, the multi-layered information recording medium has:

(a) multiple recording layers, each of the recording layers having a guiding groove and recording marks formed in the guiding groove, the guiding groove having a track pitch determined by a quadratic function of the disk thickness of the associated recording layer, and recording marks having the minimum mark length determined by a quadratic function of the disk thickness of the associated recording layer, wherein (b) the track pitch of the guiding groove and the minimum mark length of the recording marks of the reference recording layer that has a disk thickness closest to that of the single-layer information recording medium are the smallest amongst the multiple recording layers.

It is preferred that one of the multiple recording layers has a disk thickness substantially equal to that of a single-layer information recording medium to realize a layered structure of large-capacity recording medium.

In a preferred example, the guiding groove of each of the recording layers has a wobble representing information unique to the recording medium. The wobble of each of the recording layers is shaped such that the ratio of the track pitch to the wobble displacement of the associated recording layer is equal to the ratio of the track pitch of a single-layer information recording medium to the wobble displacement of the single-layer information recording medium, or such that the ratio of the minimum mark length to the wobble frequency of the associated recording layer is equal to the ratio of the minimum mark length of a single-layer information recording layer to the wobble frequency of the single-layer information recording layer.

By optimizing the wobble displacement and the wobble frequency at each of the recording layers, wobble signals can be acquired from each of the recording layers of the multi-layered information recording medium at signal quality equal to that of a single-layer information recording medium.

In a preferred example, information about the track pitch or the minimum mark length is recorded as the wobble in each of the recording layers, or alternatively, an information area for recording the information about the track pitch or the minimum mark length is provided in each of the recording layers.

By acquiring the information unique to the recording medium from the wobble or the recording-layer-related information area of each of the recording layers, high-speed servo controls can be carried out after inter-layer jumping.

In the third aspect of the invention, an information recording apparatus operative for both a single-layer information recording medium having a single recording layer on one side of the medium and a multi-layered information recording medium having multiple recording layers on one side of the medium is provided. This information recording apparatus is configured to:

(a) write information in a multi-layered information recording medium by forming recording marks in each of multiple recording layers of the multi-layered information recording medium such that the minimum mark length of each of the recording layers is a quadratic function of a disk thickness of the associated recording layer, and (b) such that the minimum mark length of a reference recording layer having a disk thickness closest to that of a single-layer information recording medium becomes the smallest amongst the multiple recording layers of the multi-layered information recording medium.

In a preferred structure, the information recording apparatus is configured to increase a rotational speed of the multi-layered information recording medium as the separation of the currently processed recording layer from the reference recording layer becomes greater.

Alternatively, the information recording apparatus may be configured to increase the time duration of the recording pulse as the separation of the currently processed recording layer from the reference recording layer becomes greater.

In the fourth aspect of the invention, an information reproducing apparatus for reproducing information from a multi-layer information recording medium is provided. The information reproducing apparatus employs a differential push-pull method using a main beam and a sub-beam to perform track control, and changes the gain ratio of the push-pull signal generated by the sub-beam according to the track pitch of the guiding groove of each of the recording layers during the track control.

Advantage of the Invention

By optimizing the track pitch or the minimum mark length at each of the recording layers of a multi-layered information recording medium, data can be recorded in each of the recording layers at the same signal quality as a single-layer information recording medium.

Because no spherical aberration correcting elements are required in a multi-layered information recording medium capable of large-capacity data recording and reproducing, time required to perform inter-layer jumping can be reduced.

LIST OF SYMBOLS

Figure 1:
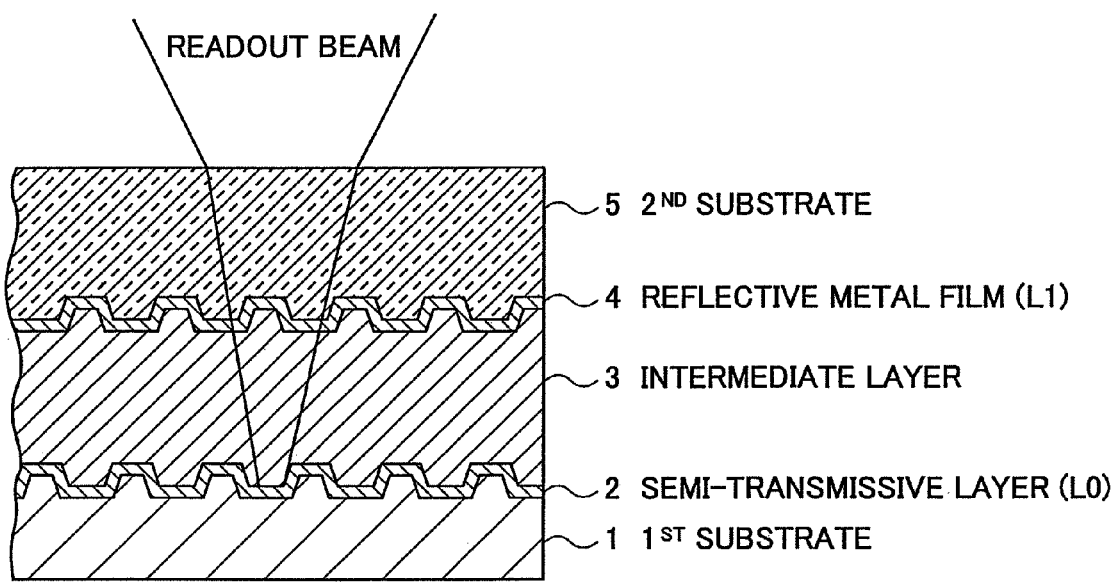
FIG. 1 illustrates a structure of a typical double-layer DVD+R.
Figure 2:
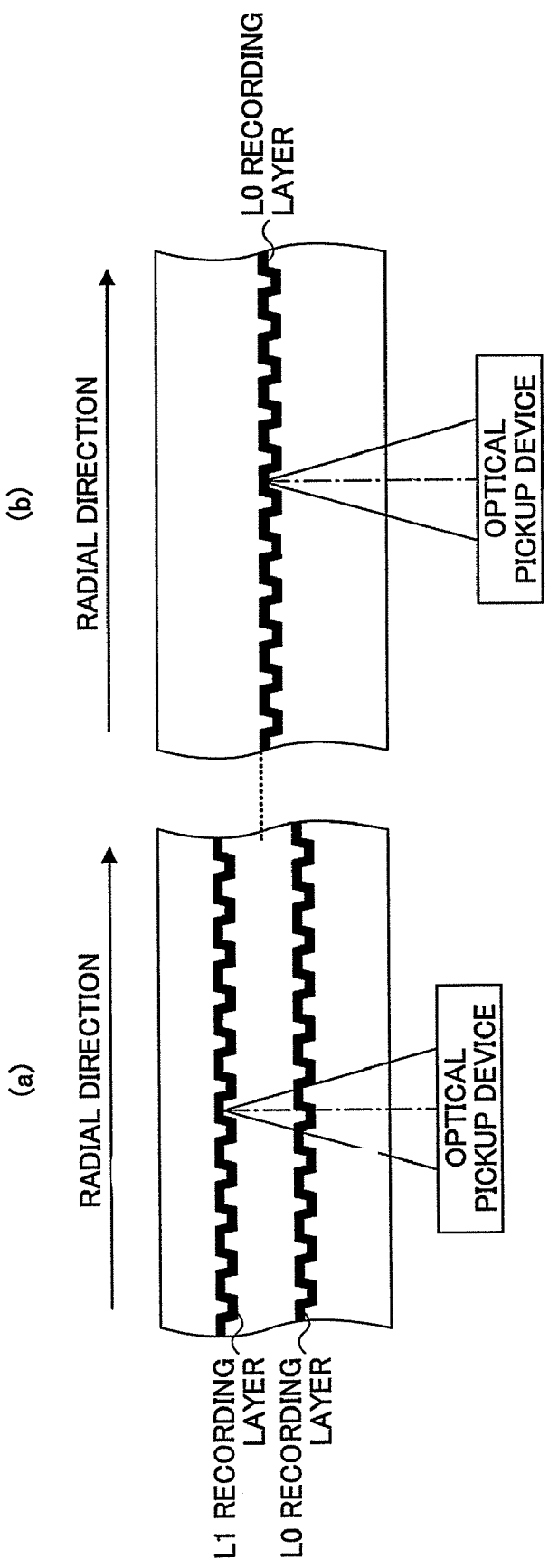
FIG. 2 illustrates disparity in focal position between a typical double-layer information recording medium and a single-layer information recording medium.

L1, ..., Ln: recording layers
R1, ..., Rn: disk thickness (disk thickness)
P0, P1, ..., Pn: track pitches of respective layers
10: multi-layered information recording medium
20: information recording apparatus
22: spindle motor
23: optical pickup device
26: control circuit
28: signal processing circuit
40: CPU

DESCRIPTION OF THE PREFERRED EMBODIMENTS

The preferred embodiments of the present invention are described below in conjunction with the attached drawings.

Figure 3:
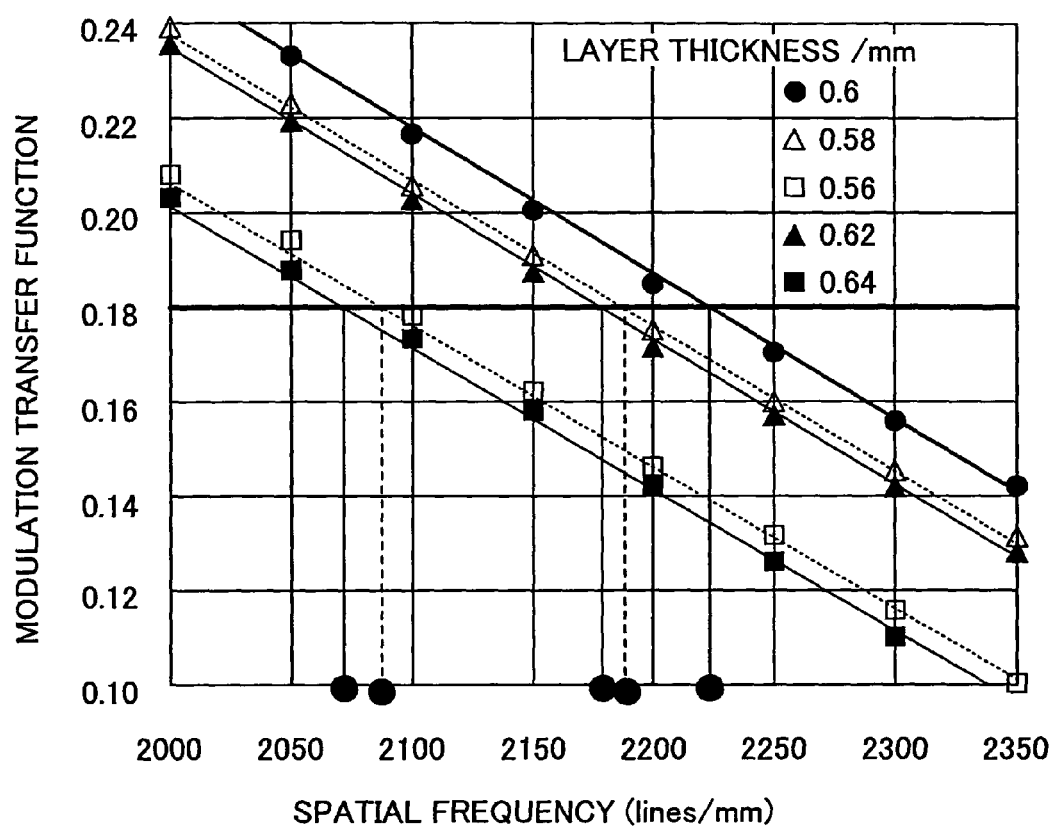
FIG. 3 is a graph showing spatial frequency dependency of the modulation transfer function (MTF) of a light spot in a radial direction of a multi-layered information recording medium according to an embodiment of the invention.

FIG. 3 is a graph showing spatial frequency dependency of modulation transfer function (MTF) of a light spot in a radial direction of a multi-layered information recording medium according to an embodiment. The conditions of the graph of FIG. 3 are listed in Table 2. It is assumed that the spherical aberration of the information reproducing apparatus becomes the optimal for the disk thickness (which denotes the distance from the light incident surface to the recording layer) of 0.6 mm.

TABLE 2

| WAVELENGTH | nm | 405 |
|---|---|---|
| NA | — | 0.65 |
| INDEX OF REFRACTION | — | 1.621 |
| RADIAL RIM | — | 0.5 |
| TANGENTIAL RIM | — | 0.5 |

With the optical system that does not have spherical aberration correcting means, the MTF of the light spot is degraded at both recording layers with the disk thickness greater than 0.6 mm (represented by the dark triangles and the dark squares in FIG. 3) and with the disk thickness smaller than 0.6 mm (represented by the white triangles and the white squares in FIG. 3).

To overcome this problem, in the first embodiment of the invention, the spatial frequency of each of the recording layers is adjusted so as to achieve substantially the same resolution (MTF) in the radial direction as that of the recording layer of 0.6 mm disk thickness.

In an information recording medium, the resolution (MTF) in the radial direction is defined by the track pitch, and the spatial frequency is one-cycle frequency of the track pitch. If an MTF at or above 0.18 is required, the track pitch of the recording layer can be determined so as to satisfy this condition at an arbitrary disk thickness.

Figure 4:
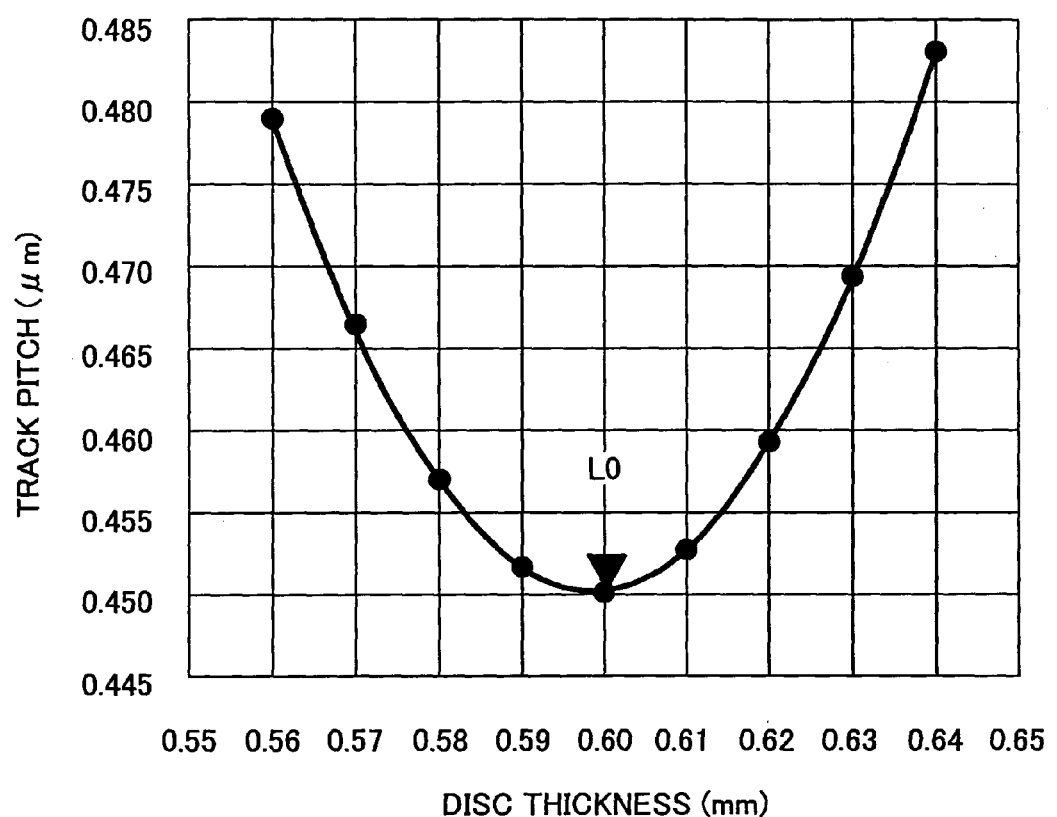
FIG. 4 is a graph showing the optimum track pitch with respect to substrate (disk) thickness under the same condition as the graph of FIG. 3.

FIG. 4 is a graph showing the optimum track pitch as a function of disk thickness (i.e., the distance from the light incident surface to the recording layer) of an information recording layer measured under the same conditions as Table 1. It is understood from the graph that the optimum track pitch is given by a quadratic function of disk thickness.

In the first embodiment, a guiding groove is formed in the recording layer L0 of a single-layer information recording medium so as to have the narrowest track pitch. In contrast, the multi-layered information recording medium has recording layers whose disk thicknesses are different from that of the recording layer L0, and therefore, the optimum track pitch of the guiding groove of each of the recording layers is defined as a quadratic function of disk thickness derived from FIG. 4.

The optimum track pitch Pi (μm) of the recording layer determined under the conditions of Table 1 is expressed by equation (5), using disk thickness di as a variable.

$$P_i = 1.9 \times 10^{-5} \times (d_i - 600)^2 + 0.45 \quad (5)$$

In order to maintain the optical resolution (MTF) above a prescribed level, the track pitch has to satisfy condition (6).

$$P_i \geq 1.9 \times 10^{-5} \times (d_i - 600)^2 + 0.45 \quad (6)$$

Figure 5:
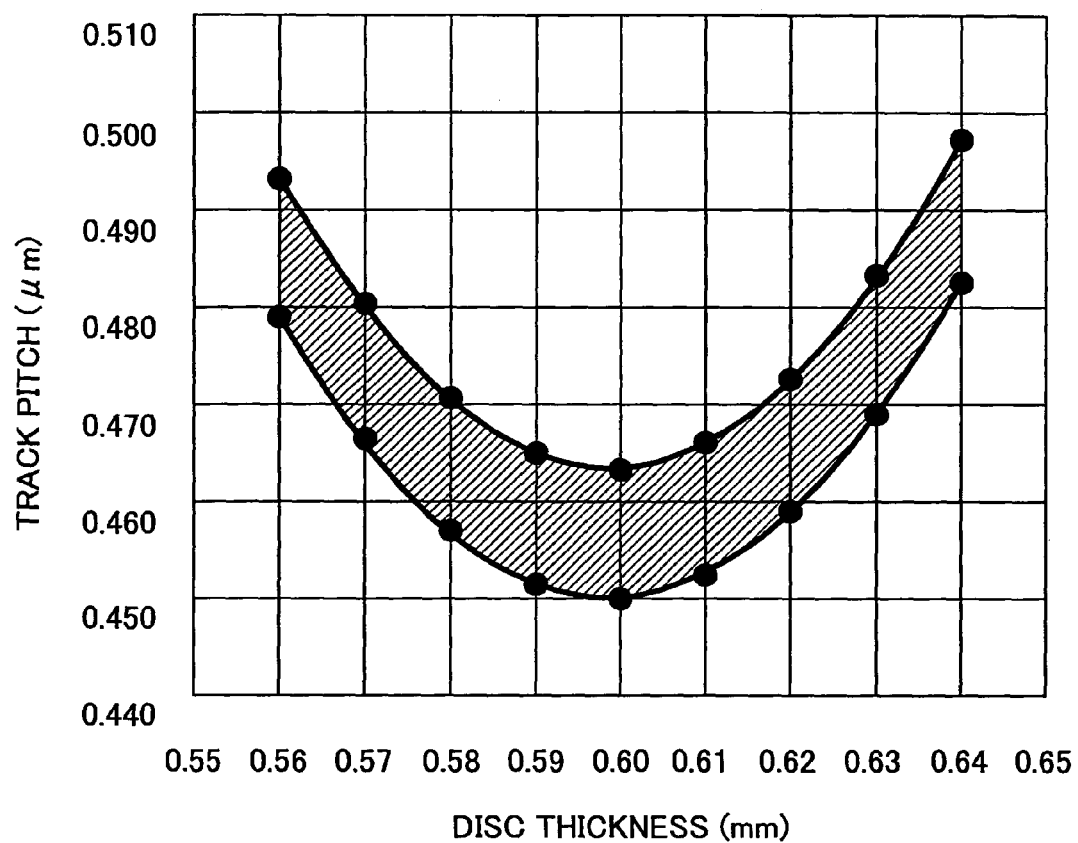
FIG. 5 is a graph showing the acceptable range of the optimum track pitch with respect to the substrate (disk) thickness illustrated in FIG. 4.

If, however, the track pitch Pi exceeds too much the condition of Equation (5), then the capacity of the information recording medium decreases. Accordingly, it is preferable that the acceptable range of the actual track pitch Pi be within 3% above the value defined by Equation (5). The acceptable range of the track pitch is illustrated in FIG. 5.

FIG. 6(a) is a cross-sectional view of the multi-layered information recording medium according to the first embodiment, which figure schematically illustrates the structure of the guiding grooves of multiple recording layers. The disk thickness (i.e., the distance from the light incident surface) of recording layer L0 of the multi-layered information medium is consistent with that of the single-layer information recording medium illustrated in FIG. 6(b).

As the position of the recording layer is separated from the reference recording layer L0, the track pitch of that recording layer (L1 or L2) is increased along the quadratic curve.

Although, in the example shown in FIG. 6(a), the track pitch increases in one direction (in which the disk thickness decreases) from the reference layer L0, the invention is not limited to this example. The track pitch may increase in two directions from the reference layer L0 (in directions of increased disk thickness and decreased disk thickness), as illustrated in FIG. 7.

By changing the track pitches of the recording layers of the multi-layered information recording medium in a quadratic manner depending on the separation from the reference recording layer, which layer corresponds to the recording layer of a single-layer information recording medium, the signal quality of each of the recording layers can be maintained substantially the same as that of the single-layer information recording medium.

The above-described structure may be applied to data recording and reproducing using an optical system having a wavelength of 400 nm to 420 nm and with an objective lens with NA value of 0.63 to 0.67.

Because no spherical aberration correction means are required in the first embodiment, it is unnecessary to count a spherical aberration correcting time when performing interlayer jumping. Consequently, a high-speed accessible multi-layered information recording medium can be realized.

Figure 8:
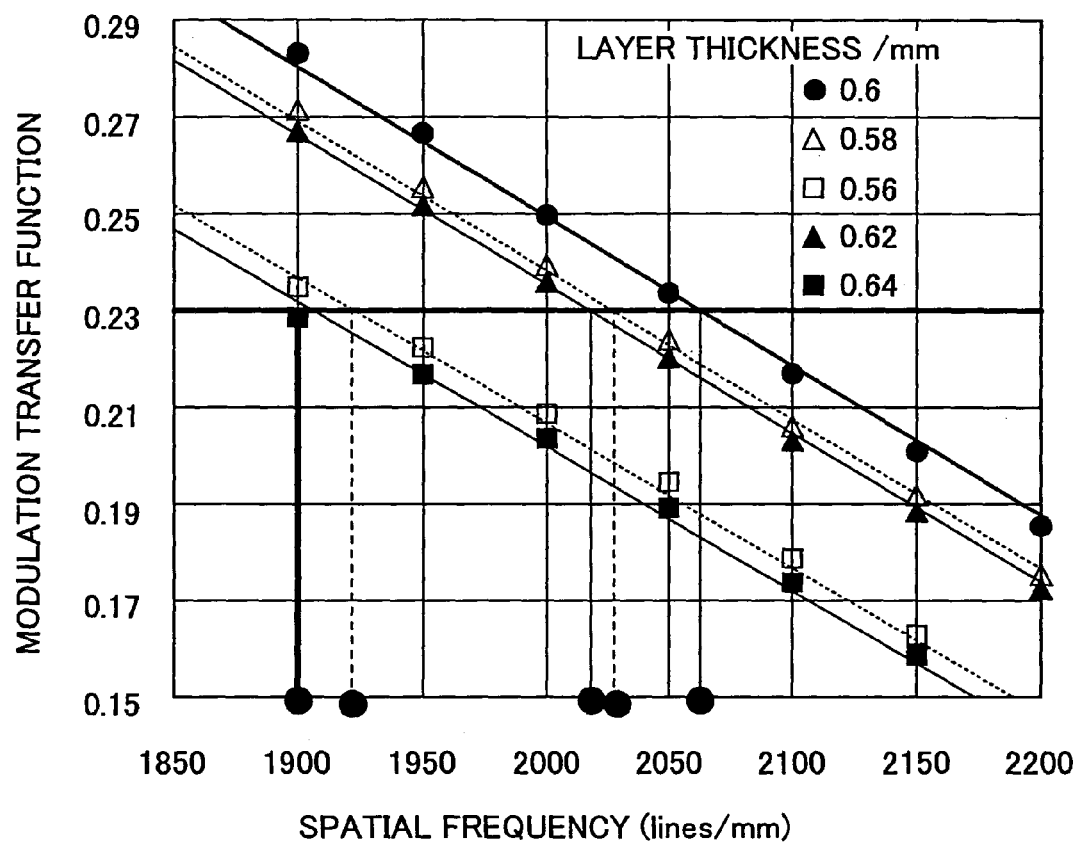
FIG. 8 is a graph showing spatial frequency dependency of the modulation transfer function (MTF) of a light spot in a tangential direction (data recording direction of each recording layer) of a multi-layered information recording medium according to an embodiment of the invention.

FIG. 8 is a graph showing spatial frequency dependency of the modulation transfer function (MTF) of a light spot in the tangential direction (the data recording direction of a recording layer) of the multi-layered information recording medium according to the second embodiment of the invention. The measurement conditions are those shown in Table 2. It is assumed that the spherical aberration of the information reproducing apparatus becomes the optimum for the disk thickness of 0.6 mm.

With the optical system that does not have spherical aberration correcting means, the MTF of the light spot in the tangential direction is degraded at both the recording layers with the disk thickness greater than 0.6 mm (represented by the dark triangles and the dark squares in FIG. 8) and with the disk thickness smaller than 0.6 mm (represented by the white triangles and the white squares in FIG. 8). To overcome this problem, in the second embodiment of the invention, the spatial frequency of each of the recording layers is adjusted direction so as to achieve substantially the same resolution (MTF) in the tangential direction as that of the recording layer of 0.6 mm disk thickness.

In an information recording medium, the resolution (MTF) in the tangential direction is defined by the minimum mark length (or the minimum pit size) of the recording marks. The inverse of the minimum mark length is the spatial frequency in the tangential direction.

The minimum unit of data in an optical disk is a channel bit length (1T), and the mark length is an integral multiple (nT) of the channel bit length. The minimum mark length is 3T (n=3) in EFM modulation or 2-7 modulation. With 1-7 modulation, such as MO, Blu-Ray, or HD-DVD, the minimum mark length is 2T (n=2). With a multi-level recording scheme (See, patent-related publication 7 listed above), the minimum mark length is defined as a cell size.

If an MTF at or above 0.18 is required, the minimum mark length of the recording layers can be determined so as to satisfy this condition at an arbitrary disk thickness.

Figure 9:
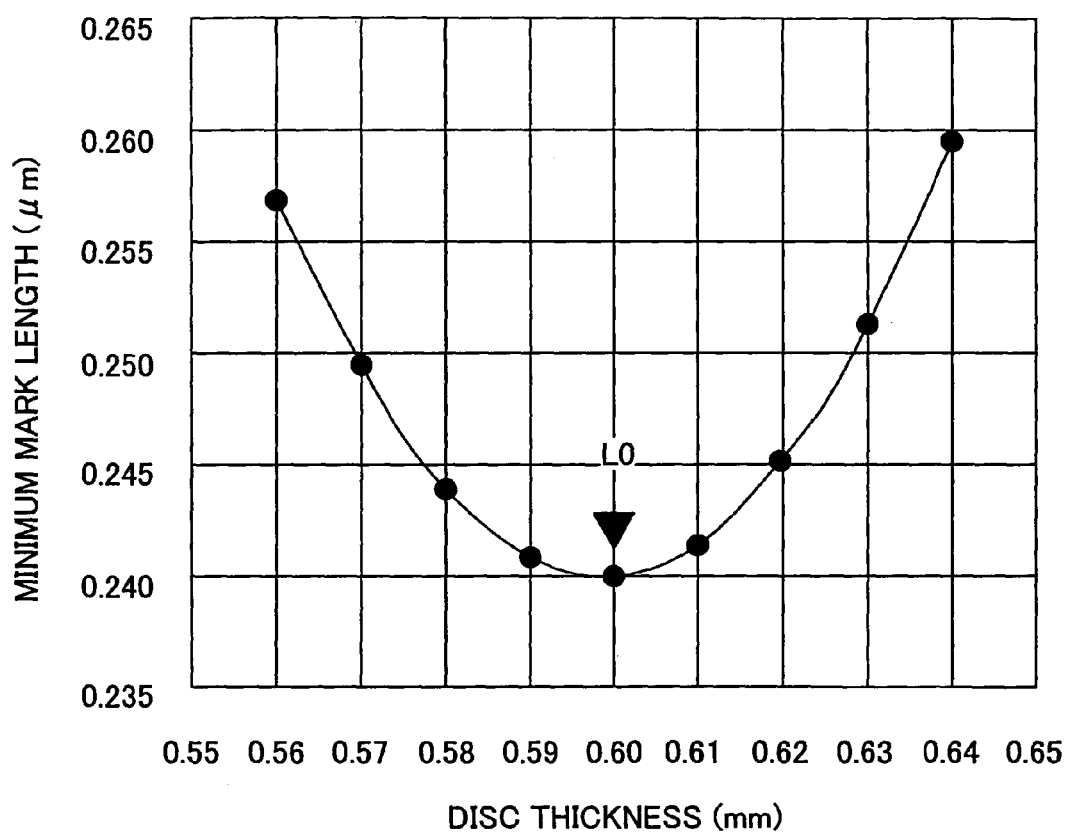
FIG. 9 is a graph showing the optimum values of the minimum mark length with respect to substrate (disk) thickness under the same condition as the graph of FIG. 8.

FIG. 9 is a graph showing the optimum values of the minimum mark length as a function of disk thickness (i.e., the distance from the light incident surface to the recording layer) of an information recording layer measured under the same conditions shown in FIG. 8. It is understood from the graph that the optimum value of the minimum mark length is given as a quadratic function of disk thickness.

In the second embodiment, pits (recording marks) are formed in the recording layer L0 of a single-layer information recording medium so as to have the smallest minimum mark length. In contrast, the multi-layered information recording medium has recording layers whose disk thicknesses are different from that of the recording layer L0, and therefore, the optimum value of the minimum mark length of each of the recording layers is defined by a quadratic function of disk thickness derived from FIG. 9.

The minimum mark length Si (μm) of the recording layer determined under the conditions of Table 2 is expressed by equation (7), using disk thickness di as a variable.

$$S_i = 1.14 \times 10^{-5} \times (d_i - 600)^2 + 0.24 \quad (7)$$

In order to maintain the optical resolution (MTF) in the tangential direction above a prescribed level, the minimum mark length has to satisfy condition (8).

$$S_i \geq 1.14 \times 10^{-5} \times (d_i - 600)^2 + 0.24 \quad (8)$$

Figure 10:
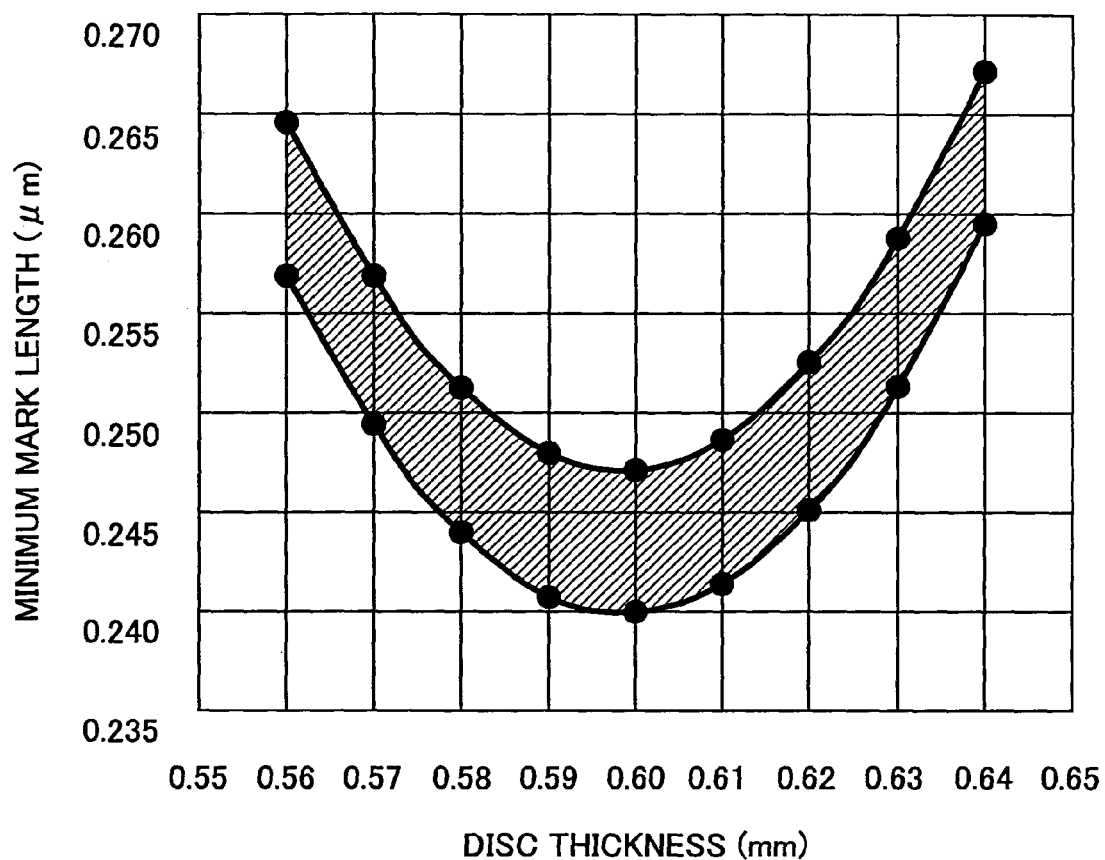
FIG. 10 is a graph showing the acceptable range of the optimum values of the minimum mark length with respect to the substrate (disk) thickness illustrated in FIG. 9.

If, however, the minimum mark length Si exceeds too much the condition of Equation (7), then the capacity of the information recording medium decreases. Accordingly, it is preferable that the acceptable range of the minimum mark length Si is within 3% above the value defined by Equation (7). The acceptable range of the minimum mark length is illustrated in FIG. 10.

Figure 11:
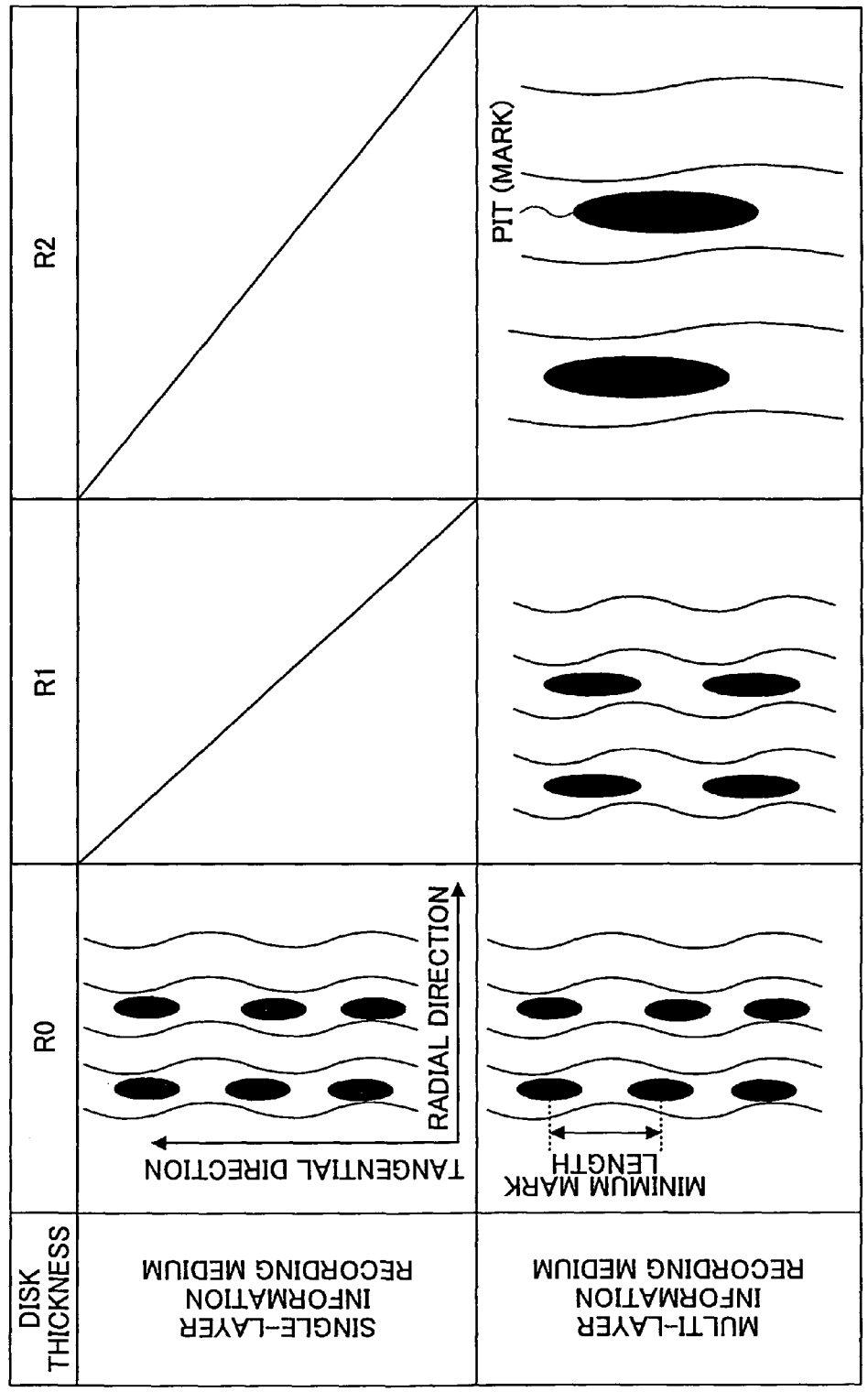
FIG. 11 is a schematic diagram illustrating the minimum mark length of each of the recording layers of a multi-layered information recording medium according to an embodiment of the invention.

FIG. 11 schematically illustrates the minimum mark length in each of the recording layers of the multi-layered information recording medium according to the second embodiment. If the multi-layered information recording medium has a recording layer located at disk thickness R0, which is the same disk thickness as a single-layer information recording medium, the minimum mark length of that recording layer is consistent with that of the single-layer information recording medium. As the disk thickness deviates from R0 (R0<R1<R2, or R0>R1>R2), the minimum mark length increases in a quadratic manner.

By changing the minimum mark lengths of the recording layers of the multi-layered information recording medium in a quadratic manner according to the separation of the recording layer from the reference layer which corresponds to the recording layer of a single-layer information recording medium-, the signal quality of each of the recording layers can be maintained at the same level as that of the single-layer information recording medium.

The above-described structure may be applied to data recording and reproducing using an optical system having a wavelength of 400 nm to 420 nm and using an objective lens with NA value of 0.63 to 0.67.

Because no spherical aberration correction means are required in the second embodiment, it is unnecessary to count a spherical aberration correcting time when performing inter-layer jumping. Consequently, a high-speed accessible multi-layered information recording medium can be realized.

It should be noted that in the first and second embodiments, the track pitch and the minimum mark length become the smallest when the recording layer L0 is located at disk thickness d0, as illustrated in FIG. 4 and FIG. 9, respectively. Accordingly, by brining the disk thickness of any one of the recording layers of the multi-layered information recording medium consistent with that of the single-layer information recording medium, a large-capacity multi-layered information recording medium can be realized.

In FIG. 11, the guiding groove formed in the single-layer information recording medium is slightly snaking in the radial direction. This is called a wobble, and is used to record unique information (such as absolute data time or address information) for this information recording medium. In the multi-layered information recording medium of the embodiment, each of the recording layers has a different track pitch, and a wobble is formed such that the ratio of the wobble displacement Wn to the track pitch Pn (Wn/Pn) becomes constant throughout the recording layers, as expressed in Equation (9).

$$\frac{Wn}{Pn} = \text{const} \qquad (9)$$

This arrangement allows stable wobble amplitude to be acquired at each of the recording layers.

When a clock of an integral multiple is generated from the wobble signal by a phase locked loop (PLL) circuit, the clock can be used as a spindle rotation control clock or a recording clock. Accordingly, the structure of the PLL circuit can be simplified.

The wobble frequency is set to an integral multiple of the channel bit length. For example, the wobble frequency of DVD+R/RW (non-multiplied speed) is 32T which equals 818 kHz, and that of DVD-R/RW is 186T which equals 141 kHz.

In the multi-layered information medium having multiple recording layers with different minimum mark lengths, the wobble frequency is determined such that the ratio Fn/Cn (wobble frequency Fn to channel bit length Cn which is the minimum unit data length of the minimum mark length) becomes constant at each recording layer Ln. Similarly, the ratio of the wobble frequency Fn to minimum mark length Tn (Fn/Tn) also becomes constant, as expressed in Equation (10).

$$\frac{Fn}{Tn} = \text{const} \qquad (10)$$

This arrangement allows a spindle circuit clock and a recording clock to be generated for each of the recording layers using the same circuit.

In an embodiment, information about the track pitches and the minimum mark lengths, which information is unique to the information recording medium, is recorded in the wobble. An information recording apparatus of this embodiment reads the unique information from the wobble of each of the recording layers and writes this information in an information area of the associated one of the recording layers.

Information about all of the recording layers may be recorded as the unique information of the multi-layered information recording medium in the information area of each of the recording layers. In this case, the unique information has been acquired in advance prior to accessing data of any one of the recording layers, and consequently, high-speed access can be achieved.

Figure 12:
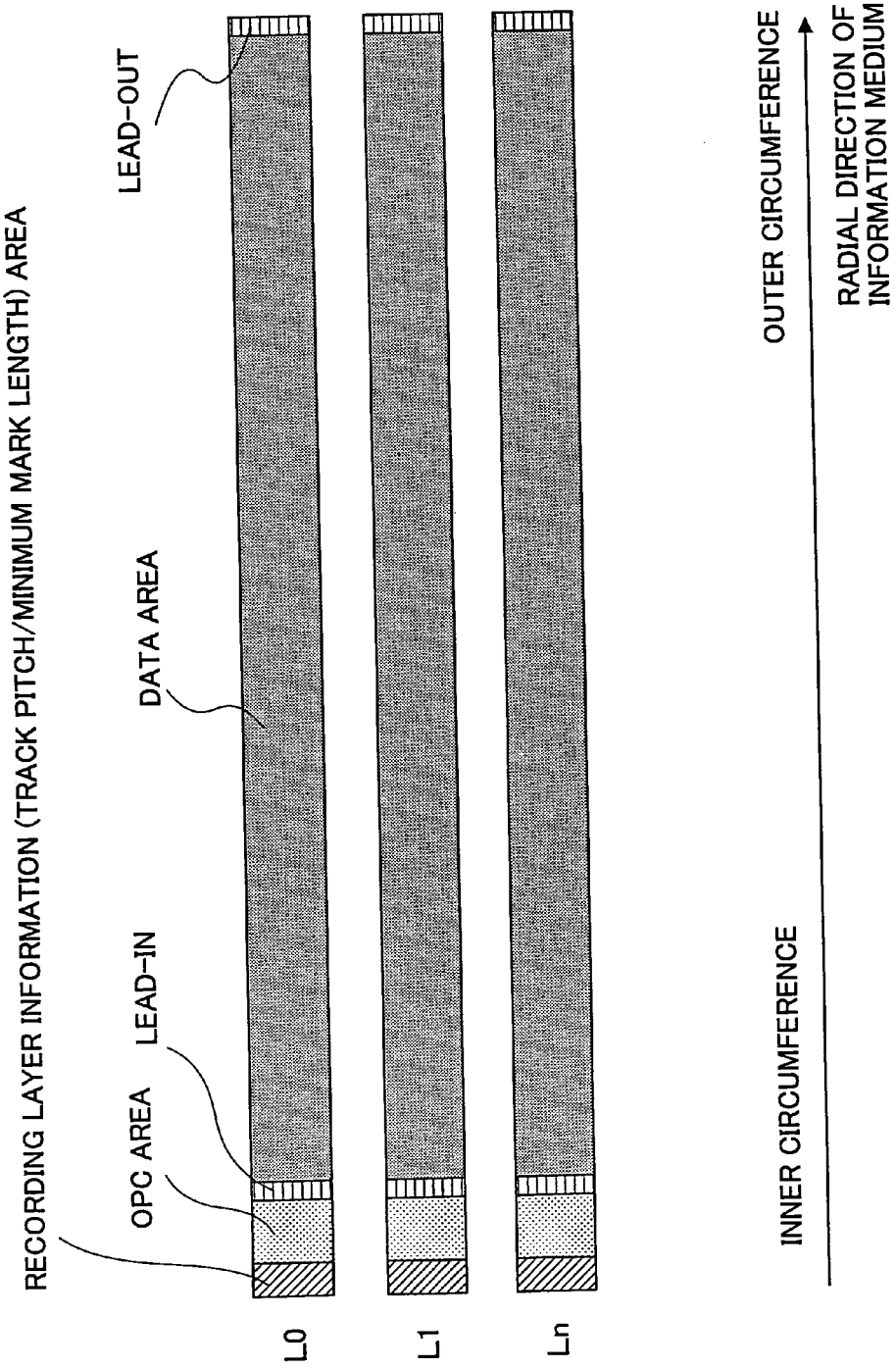
FIG. 12 is a schematic diagram illustrating an example of a recording-layer-related information area provided in each of the recording layers of a multi-layered information recording medium according to an embodiment of the invention.

FIG. 12 illustrates an example of the area structure of each of the recording layers of the multi-layered information recording medium. In this example, an information area (recording layer information area) for recording the information unique to this recording medium is provided in each of the recording layers, in place of forming a wobble. When recording and reproducing data in and from the multi-layered information recording medium, the parameter values of the recording/reproducing apparatus are determined based upon the signal acquired from the information area. In the example shown in FIG. 12, the information unique to this multi-layered information recording medium, which includes the track pitches and the minimum mark lengths of all the recording layers, may be recorded in each of the recording layers L0, L1, . . . , Ln. Because the unique information has been acquired in advance whenever accessing any of the recording layers, high-speed access can be realized.

Figure 13:
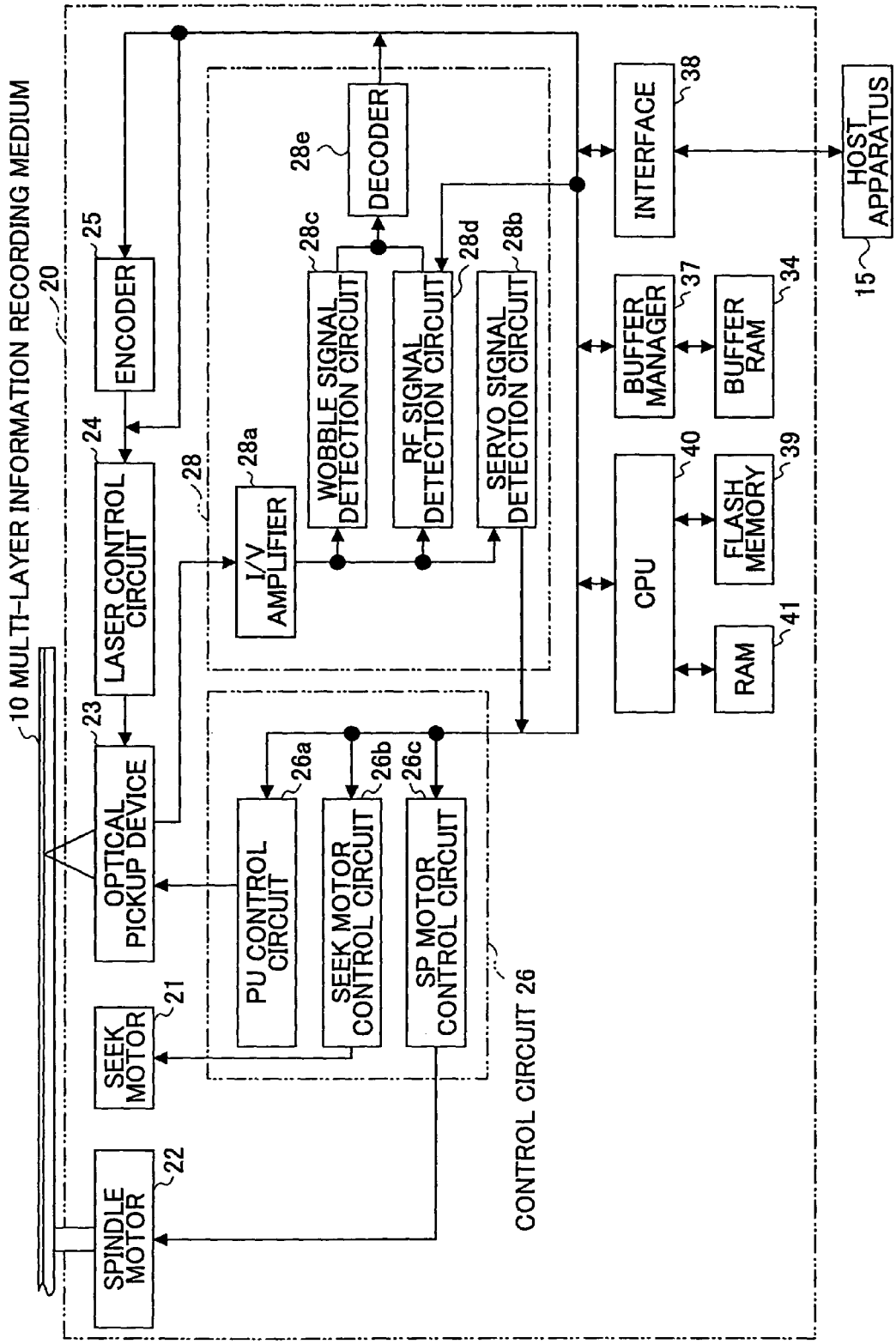
FIG. 13 is a block diagram of an information recording apparatus according to an embodiment of the invention.

FIG. 13 is a block diagram of an information recording apparatus 20 according to an embodiment of the invention. Explanation is made of how data are recorded in the above-described multi-layered information recording medium using the information recording apparatus 20 shown in FIG. 13.

A multi-layered information recording medium 10 is set in the information recording apparatus 20. When the CPU 40 receives a recording request from the host apparatus 15 via the interface 38, a wobble signal is generated by the wobble signal detection circuit 28c, using the signal detected by the I/V amplifier 28a of the signal processing circuit 28, and the unique information of the multi-layered information recording medium 10 is decoded by the decoder 28e. Based on the decoded information, the CPU 40 calculates spindle rotation clock frequency, the recording clock frequency, and other parameters to define the conditions of the recording operation for each of the recording layers.

The spindle rotation clock frequency is used as a control signal for controlling the rotation of the spindle motor 22 in accordance with the recording rate suitable for the associated recording layer (e.g., layer L0), and supplied to the spindle (SP) motor control circuit 26c of the control circuit 26. The recording clock frequency calculated from the minimum mark length of the associated recording layer (e.g., layer L0) is used as an operations clock of the encoder 25, or as a recording clock of the laser control circuit 24. In the latter case, a recording pulse string is generated according to the recording clock to irradiate the multi-layered information recording medium 10.

To be more precise, when the rotational speed of the multi-layered information recording medium 10 produces a prescribed linear speed, then the optical pickup device 23 first emits a reproducing light beam suitable for the recording layer L0 under the control of the laser control circuit 24 and performs focusing control and track control on the recording layer that has a disk thickness closest to the disk thickness R0 of the recording layer L0. Simultaneously, the servo signal detection circuit 28b detects a track error signal and focusing error signal based on the output signal from the optical pickup device 23, and the pickup (PU) control circuit 26a of the control circuit 26 drives the tracking actuator and the focusing actuator of the optical pickup device 23.

At the recording layer closest to the location of the recording layer L0, the optical pickup device 23 seeks information about the multi-layered information recording medium 10 in the information area and reads the data about the recording layers (including the track pitches and the minimum mark lengths) from the information area. Based on the readout data, the optical pickup device 23 determines the optimum recording pulse length or the optimum rotational speed of the spindle motor suitable for recording data in the current recording layer. The determined recording pulse length is supplied to the laser control circuit 24 to control the laser emission of the optical pickup device 23.

The determined rotational speed of the spindle motor 22 is supplied from the CPU 40 to the SP motor control circuit 26c to control the rotational speed of the multi-layered information recording medium 10. Then, the laser emission power suitable for writing data in the recording layer is determined using the OPC (optimum power control) area.

The signal processing circuit 28 acquires accurate address information from the wobble signal component of the output signal from the optical pickup device 23, and supplies the address information to the CPU 40. The CPU 40 causes the buffer manager 37 to store data supplied from the host apparatus 15 in the buffer RAM 34. If the amount of data accumulated in the buffer RAM 34 exceeds a prescribed level, the buffer manager 37 reports the excess accumulation to the CPU 40.

Upon receiving the report from the buffer manager 37, the CPU 40 instructs the encoder 25 to produce recording data, and at the same time, the CPU 40 causes the seek motor control circuit 26b of the control circuit 26 to output a seek instruction signal to the seek motor 21 so as to bring the optical pickup device 23 to the predetermined writing starting point.

The CPU 40 also determines whether the optical pickup device 23 is at the writing starting position, based on the address information from the signal processing circuit 28. If the optical pickup device 23 is at the writing starting position, the CPU 40 allows the encoder 25 to record the produced writing data, by means of the laser control circuit 24 and the optical pickup device 23, in the data area of the multi-layered information recording medium 10. At this time, the unique information of the multi-layered information recording medium 10 acquired from the wobble signal is also recorded in the recording layer information area.

When receiving from the host apparatus 15 another recording request for data recording in another recording layer, the CPU 40 reports the change of the recording layer requested by the host apparatus 15 to the signal processing circuit 28. The optical pickup device 23 changes the focal position (i.e., inter-layer jumping) based on a focusing signal generated according to the number of recording layers of the multi-layered information recording medium 10 and supplied from the PU control circuit 26a. The CPU 40 suspends the recording operation, supplies an instruction for reproducing emission to the laser control circuit 24, and then operates the optical pickup device 23 again.

The optical pickup device 23 reads the unique information (such as the track pitches or the minimum mark lengths) of the recording medium from the wobble signals. Based on the unique information, the optical pickup device 23 determined the optimum recording pulse width and the optimum spindle motor rotational speed for recording data in the recording layer of the multi-layered information recording medium 10. The optimum recording pulse width is supplied to the layer control circuit 24, which circuit then controls the laser emission of the optical pickup device 23.

The rotational speed of the spindle motor 22 is supplied to the SP motor control circuit 26c to control the rotation of the multi-layered information recording medium 10. Then, the light emission power level suitable for the recording operation is determined using the OPC area.

Then, the actual recording operation is performed according to the above-described process. By designing the apparatus so as to perform data recording starting from the reference layer having the disk thickness closest to that of the single-layer information recording medium, the recording order is clearly defined in advance, and therefore, an efficient recording operation is realized, while minimizing inter-layer jumping.

Figure 14:
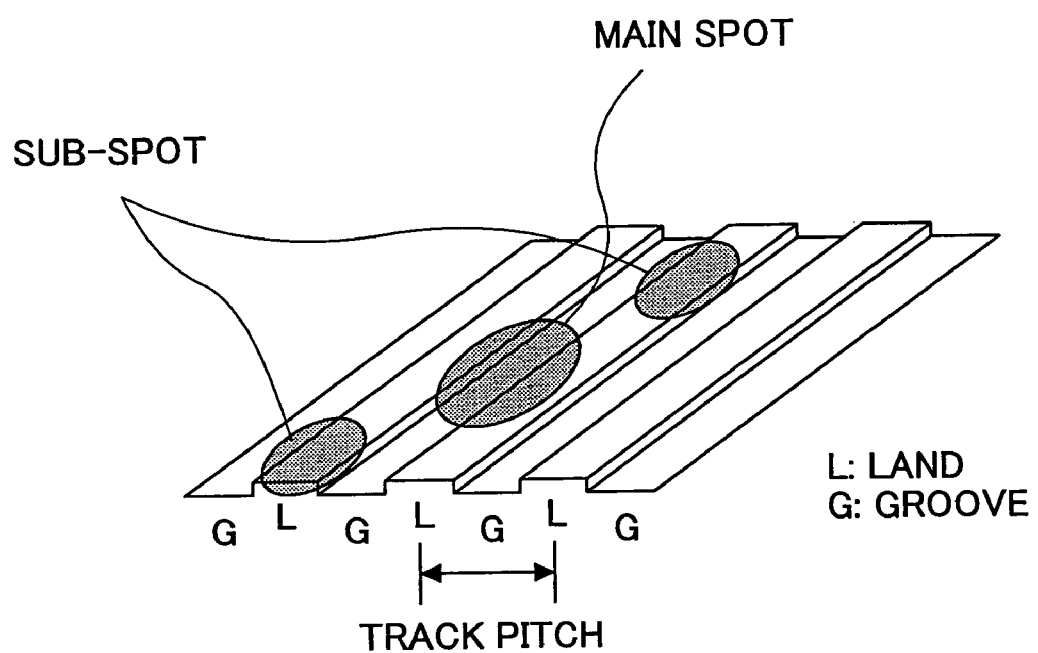
FIG. 14 is a schematic diagram for explaining an ordinary differential push-pull method.

With the information recording apparatus of the embodiment, a differential push-pull method is often used for track control during the recording operation for the multi-layered information recording medium. In the differential push-pull method, three beams are used to forms a main spot and two sub-spots, as illustrated in FIG. 14, and the push-pull signals acquired from the three beams are calculated so as to obtain a tracking signal that has little offset even if misalignment of the optical axis has occurred.

If the push-pull signals of the main spot, the leading sub-spot and the trailing sup-spot are MPP, SPP1 and SPP2, respectively, the differential push-pull signal DPP is acquired from $$DPP=MPP-K(SPP1-SPP2), \qquad (11)$$

where K is given by the ratio of the light quantity of the main spot to the total of the light quantity of the two sub-spots.

Because, in the multi-layered information recording medium, the track pitches differ from each other depending on the locations of the recording layers, the sub-spot is going to be offset from the land and the MPP/SPP ratio may vary. To overcome this problem, the K value representing the ratio of the light quantity of the main spot to the total light quantity of the two sub-spots is varied as the gain Kn of the sub-push-pull, depending on the currently processed recording layer. With this arrangement, stable differential push-pull signals are obtained from Equation (12).

$$DPP=MPP-Kn(SPP1-SPP2) \qquad (12)$$

In the embodiment, as the disk thickness of a recording layer of the multi-layered information recording medium deviates from the disk thickness Ro of the single-layer information recording medium, the track pitch and the minimum mark length (or the interval) become less dense, and therefore, the data recording capacity decreases. According, by starting data recording from the recording layer with the disk thickness closest to the reference thickness R0, a large amount of data recording can be achieved with less inter-layer jumping.

In addition, because the minimum mark length differs among the recording layers, the spindle rotational speed has to be determined so as to be suitable for the minimum mark length of the associated recording layer.

If the disk thicknesses of the recording layers are R0, R1, . . . , Rn, and if the spindle rotational speeds of the respective recording layers are A0, A1, . . . , An (where n is a natural number), then the spindle rotational speeds satisfy the relationship $$A0<A1<\ldots<An. \qquad (13)$$

If a double-layer information recording medium is used, then, the relationship $$A0<A1 \qquad (14)$$

is to be satisfied.

Once the spindle rotational speed reaches a physically acceptable level, the recording clock frequency may be adjusted by controlling pulse duration, in place of controlling the spindle rotational speed, to perform optimum recording.

In this case, if the disk thicknesses of the recording layers are R0, R1, . . . , Rn, and if the pulse durations of the respective recording layers are T0, T1, . . . , Tn (where n is a natural number), then the pulse durations satisfy the relationship $$T0<T1<\ldots<Tn. \qquad (15)$$

If a double-layer information recording medium is used, then, the relationship $$T0<T1 \qquad (16)$$

is to be satisfied.

Next, explanation is made of an information recording medium according to the third embodiment, in conjunction with FIG. 3 through FIG. 14, which figures have also been referred to in the first and second embodiments. In the third embodiment, each recording layer has a spiral guiding groove.

The spatial frequency characteristic of the MTF of the light spot in the radial direction of the multi-layered information recording medium of the third embodiment is one illustrated in FIG. 3. The conditions are listed in Table 3.

TABLE 3

| WAVELENGTH | nm | 405 |
|---|---|---|
| NA | | 0.65 |
| L0 DISK THICKNESS | mm | 0.6 |
| L1 DISK THICKNESS | mm | 0.575 |
| INDEX OF REFRACTION | | 1.621 |
| RADIAL RIM | | 0.5 |
| TANGENTIAL RIM | | 0.5 |

With an optical system that does not have spherical aberration correcting means, the MTF of the light spot is degraded at both recording layers with the disk thickness greater than 0.6 mm (represented by the dark triangles and the dark squares in FIG. 3) and with the disk thickness smaller than 0.6 mm (represented by the white triangles and the white squares in FIG. 3).

To overcome this problem, in the first embodiment of the invention, the spatial frequency of each of the recording layers is adjusted so as to achieve substantially the same resolution (MTF) in the radial direction as that of the recording layer of 0.6 mm disk thickness.

In an information recording medium, the resolution (MTF) in the radial direction is defined by the track pitch, and the spatial frequency is one-cycle frequency of the track pitch. If an MTF at or above 0.18 is required, the track pitch of the recording layer can be determined so as to satisfy this condition at an arbitrary disk thickness.

FIG. 4 is a graph showing the optimum track pitch as a function of disk thickness (i.e., the distance from the light incident surface to the recording layer) of an information recording layer measured under the same conditions as Table 3.

In the third embodiment, the recording layer L0 of the single-layer information recording medium has a guiding groove formed at the narrowest track pitch. In contrast, the multi-layered information recording medium has recording layers with disk thicknesses different from that of the recording layer L0, and therefore, the optimum track pitch of the guiding groove of each of the recording layers is set slightly broader than the track pitch of the single-layer recording medium.

It is assumed that the disk thickness of the recording layer L0 of the single-layer information recording medium is R0, and that the multi-layered information recording medium has a reference recording layer L0 with a disk thickness R0, while other recording layers L1, . . . , Ln (where n is a natural number) have disk thicknesses R1, . . . , Rn separated from the reference layer L0. If the track pitches of the respective recording layers are P0, P1, . . . , Pn, then the guiding grooves formed in the multi-layered information recording medium satisfy the condition $$P0 < P1 < \ldots < Pn. \quad (17)$$

If a double-layer information recording medium is used, then, the relationship $$P0 < P1 \quad (18)$$

is to be satisfied.

The spiral guiding grooves formed in the recording layers of the multi-layered information medium of the third embodiment have the cross-sectional structures shown in FIG. 6(a). In this multi-layered information recording medium, the track pitch of the recoding layer L0 having a disk thickness (i.e., the distance from the light incident surface) equal to that of the recording layer of the single-layer information recording medium shown in FIG. 6(b) is consistent with the track pitch of the single-layer information recording medium. As the position of the recording layer is further separated from the reference recording layer L0, the track pitch of that recording layer (L1 or L2) is increased.

When the separation or distance $d_{sp}$ between two adjacent recording layers is narrowed, reflected light from the adjacent recording layers comes into a light-receiving element, in addition to light beams from the currently processed (reproduced) recording layer. The light components reflected from the adjacent recording layers become offset. If the ratio of the light quantity of the flare to that of the signal light is $\alpha$, it is known that $\alpha$ is expressed by $$\alpha = \frac{2}{\pi R_{def}^2} \int_{-L_d/2}^{L_d/2} dx \int_{-L_d/2}^{L_d/2} dy \exp\left\{\frac{-2(x^2 + y^2)}{R_{def}^2}\right\} \quad (19)$$

$$R_{def} = \frac{2d_{sp}}{n_{sp}} \left(\frac{NA_{obj}}{NA_{det}}\right)^2 \tan\{\sin^{-1}(NA_{det})\}$$

where $n_{sp}$ is index of refraction between adjacent recording layers, $NA_{obj}$ is the numerical aperture of the objective lens, $NA_{det}$ is the numerical aperture of the detection lens, and $L_d$ is the length on a side of a light-receiving element (assuming that the light-receiving element is square).

If the acceptable range of the ratio $\alpha$ of the reflected light from the adjacent recording layers is $\alpha \leq 1/10$ when using the optical pickup device with the parameters of $n_{sp}=1.62$, $NA_{obj}=0.65$, $NA_{det}=0.065$, and $L_d=100$ µm, then the acceptable range of the separation $d_{sp}$ between adjacent recording layers becomes $d_{sp} \geq 30.3$ µm.

From FIG. 4, if the n-th recording layer of the multi-layered information recording medium has a disk thickness of 0.6 mm, then the disk thickness of the m-th recording layer adjacent to the n-th recording has to be at or above 0.6303 mm. If the track pitch of the n-th recording layer is TPn, and if the track pitch of the adjacent (m-th) recoding layer is TPm, then the flare from the adjacent recording layers can be reduced, while achieving sufficient MTF at each of the recording layers, by satisfying the condition defined in expression (20).

$$\left|\frac{TPm - TPn}{TPm}\right| \geq 0.043 \quad (20)$$

In place of the structure shown in FIG. 6(a) in which multiple recording layers are arranged so as to be closer to the light incident surface (with the decreasing disk thickness) as compared to the reference layer, the recording layers may be arranged so as to be away from the light incident surface (with the increasing disk thickness) as compared to the reference layer. Alternatively, the recording layers may be arranged on both sides of the reference layer in directions of decrease and increase of the disk thickness, as illustrated in FIG. 7(a) and FIG. 7(b).

By employing the arrangement of the third embodiment, the signal quality in the radial direction of each of the recording layers of the multi-layered information medium, each layer having a spiral guiding groove, can be maintain equivalent to that of the single-layer information recording medium.

Because no spherical aberration correcting means are employed, extra time for performing correction for spherical aberration is not required during the inter-layer jumping control. Consequently, a high-speed accessible multi-layered information recording medium of a spiral type can be provided.

Next, a multi-layered information recording medium according to the fourth embodiment of the invention is explained. In this embodiment, for a spiral-type multi-layered information recording medium having a spiral groove in each of the recording layers, the tangential direction signal quality of each recording layer can be maintained at a similar level to that of a single-layer information recording medium. FIG. 8 is a graph showing spatial frequency dependency of the modulation transfer function (MTF) of a light spot in the tangential direction (the data recording direction of a recording layer) of the multi-layered information recording medium. The measurement conditions are those shown in Table 3. It is assumed that the spherical aberration of the information reproducing apparatus becomes the optimum for the disk thickness of 0.6 mm.

With an optical system that does not have spherical aberration correcting means, the MTF of the light spot in the tangential direction is degraded at both the recording layers with the disk thickness greater than 0.6 mm (represented by the dark triangles and the dark squares in FIG. 8) and with the disk thickness smaller than 0.6 mm (represented by the white triangles and the white squares in FIG. 8). To overcome this problem, in the second embodiment of the invention, the spatial frequency of each of the recording layers is adjusted direction so as to achieve substantially the same resolution (MTF) in the tangential direction as that of the recording layer of 0.6 mm disk thickness.

In an information recording medium, the resolution (MTF) in the tangential direction is defined by the minimum mark length (or the minimum pit size) of the recording marks. The inverse of the minimum mark length is the spatial frequency in the tangential direction.

The bit linear density is a channel bit length (1T), and the mark linear density is an integral multiple (nT) of the channel bit length. The minimum mark length is 3T (n=3) in EFM modulation or 2-7 modulation. With 1-7 modulation, such as MO, Blu-Ray, or HD-DVD, the minimum mark length is 2T (n=2). With a multi-level recording scheme (See, patent-related publication 7 listed above), the minimum mark length is defined as a cell size.

If an MTF at or above 0.18 is required, the minimum mark length of the recording layers can be determined so as to satisfy this condition at an arbitrary disk thickness. The relationship between the optimum value of the minimum mark length and disk thickness under the conditions shown in Table 3 is one shown in FIG. 9.

It is assumed that the disk thickness of the recording layer L0 of the single-layer information recording medium is R0, and that the multi-layered information recording medium has a reference recording layer L0 with a disk thickness R0, while other recording layers L1, ..., Ln (where n is a natural number) have disk thicknesses R1, ..., Rn separated from the reference layer L0. If the minimum mark lengths of the respective recording layers are D0, D1, ..., Dn, then the pits formed in the multi-layered information recording medium satisfy the condition $$D0 < D1 < \ldots < Dn. \quad (21)$$

If a double-layer information recording medium is used, then, the relationship $$D0 < D1 \quad (22)$$

is to be satisfied.

Figure 6:
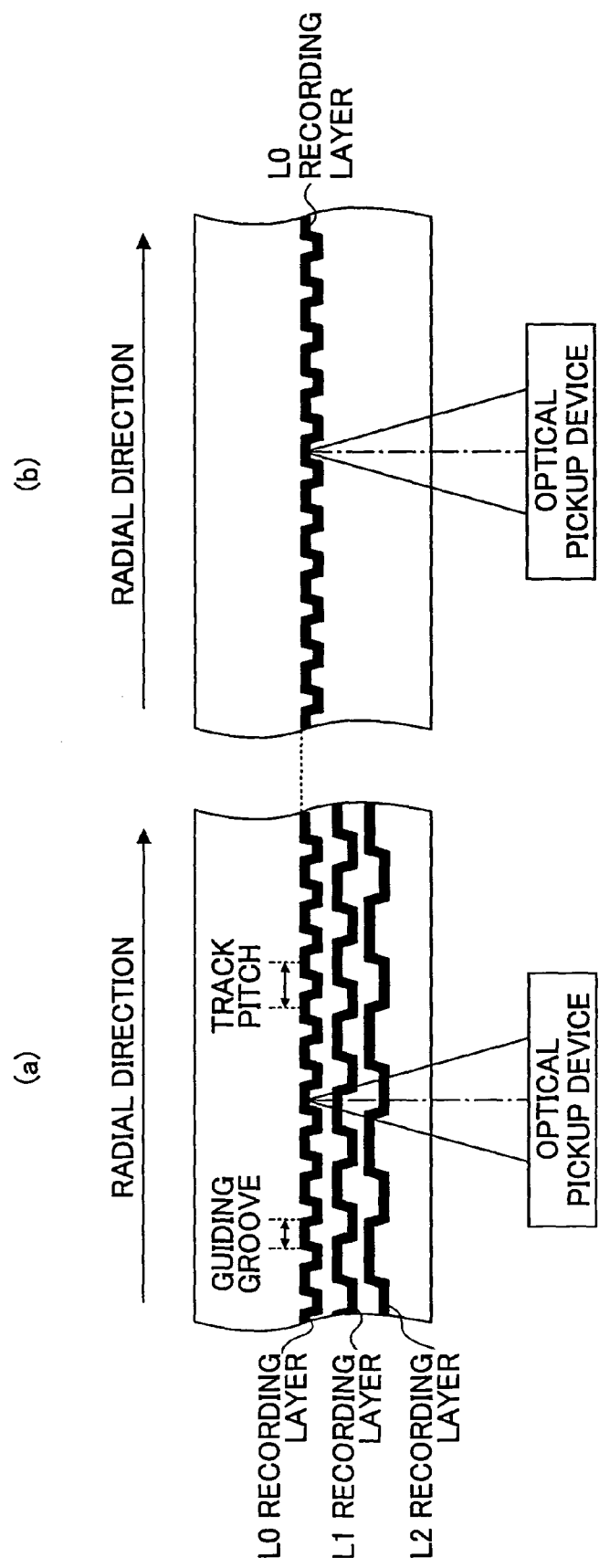
FIG. 6 illustrates an example of the layered structure of the guiding grooves of a multi-layered information recording medium according to an embodiment of the invention, in comparison with a single-layer information recording medium.
Figure 7:
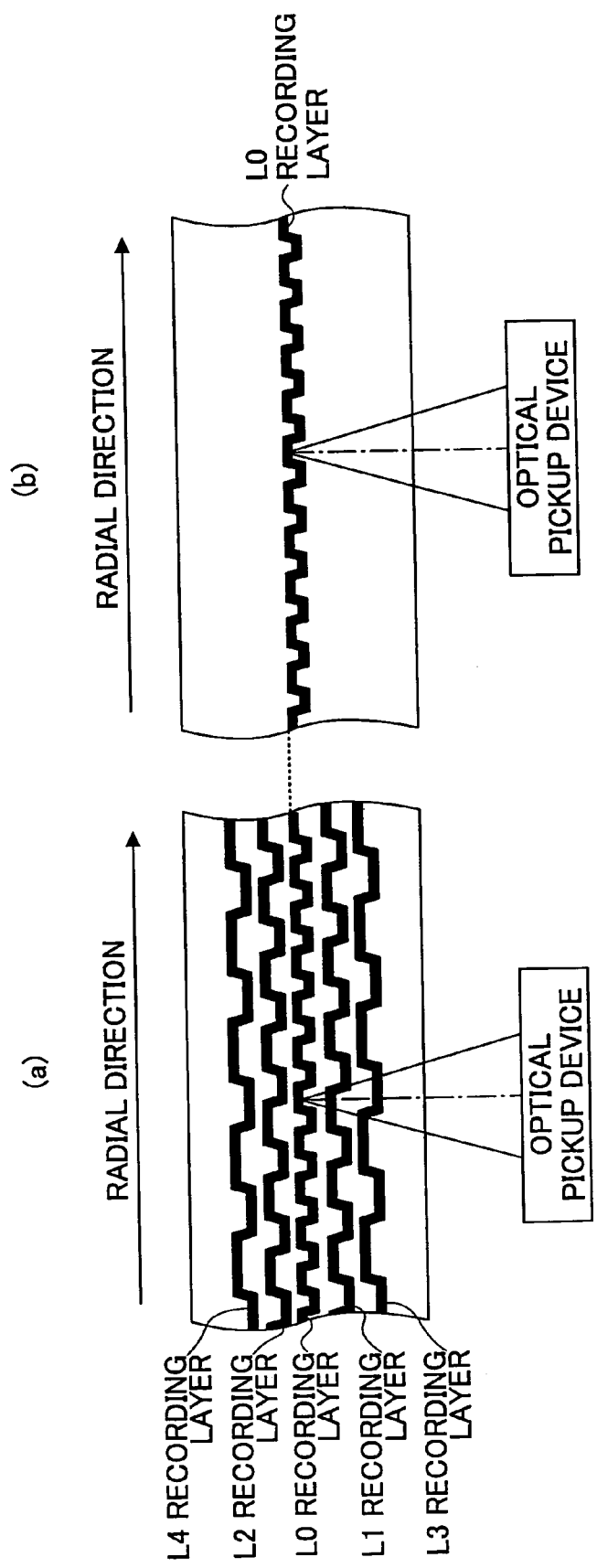
FIG. 7 illustrated another example of the layered structure of the guiding grooves of a multi-layered information recording medium according to an embodiment of the invention, in comparison with a single-layer information recording medium.

The configuration of the minimum mark length of each of the recording layers of the multi-layered information recording medium of the fourth embodiment is shown in FIG. 6. If the multi-layered information recording medium has a reference recording layer having the disk thickness R0 equal to that of the single-layer information recording medium, the minimum mark length of this reference recording layer is the same as that of the single-layer information recording medium. As the position of the recording layer is separated from the reference recording layer L0, the minimum mark length of the recording layer is increased.

If the acceptable range of the ratio α of the light quantity reflected from the adjacent recording layers is $\alpha \geq 1/10$, then the flare from the adjacent recording layers can be reduced, while achieving sufficient MTF at each of the recording layers, by satisfying the condition defined in expression (23).

$$\left| \frac{Dm - Dn}{Dm} \right| \geq 0.048 \quad (23)$$

By employing the above-described arrangement of the fourth embodiment, the signal quality in the tangential direction of each of the recording layers of the multi-layered information medium can be maintain equivalent to that of the single-layer information recording medium. By not using spherical aberration correcting means, time required to perform correction for spherical aberration can be eliminated during the inter-layer jumping control. Consequently, a high-speed accessible multi-layered information recording medium of a spiral type can be provided.

The track pitch and the minimum mark length become the smallest at the recording layer L0 with disk thickness R0, as illustrated in FIGS. 4, 5, 9, and 10. Accordingly, by setting the disk thickness of any one of the recording layers equal to that of a single-layer information recording medium, a large-capacity multi-layered information recording medium can be realized.

As illustrated in FIG. 11, the guiding groove in which pits are formed is slightly snaking in the radial direction. This is called a wobble, and is used to record unique information (such as absolute data time or address information) for this information recording medium. In the multi-layered information recording medium of the embodiment, the track pitches of the recording layers Ln may differ from each other.

In this embodiment, the wobble displacement of each recording layer is determined such that the ratio of the wobble displacement Wn to the track pitch Pn (Wn/Pn) becomes constant throughout the recording layers. With this arrangement, stable wobble amplitude can be acquired at each of the recording layers.

When a clock of an integral multiple is generated from the wobble signal by a phase locked loop (PLL) circuit, it can be used as a spindle rotation control clock or a recording clock. Accordingly, the structure of the PLL circuit can be simplified.

The wobble frequency is set to an integral multiple of the channel bit length. For example, the wobble frequency of DVD+R/RW (non-multiplied speed) is 32T which equals 818 kHz, and that of DVD-R/RW is 186T which equals 141 kHz.

In the multi-layered information medium having multiple recording layers with different minimum mark lengths, the wobble frequency is determined such that the ratio Wn/Cn (wobble frequency Wn to channel bit length Cn which is the minimum unit data length of the minimum mark length) becomes constant at each recording layer Ln. Consequently, a spindle circuit clock and a recording clock can be generated for each of the recording layers using the same circuit.

In an embodiment, information about the track pitches and the minimum mark lengths, which information is unique to the information recording medium, is recorded in the wobble. An information recording apparatus of this embodiment reads the unique information from the wobble of each of the recording layers and writes this information in a recording layer information area of the associated one of the recording layers.

The arrangement of the recording layer information area is, for example, one illustrated in FIG. 12. When recording and reproducing data in and from the multi-layered information recording medium, the parameter values of the recording/reproducing apparatus are determined based upon the signal acquired from the recording layer information area.

The information recording apparatus for performing recording operations on a spiral-type multi-layered information recording medium has a structure shown in the block diagram of FIG. 13.

Briefly describing when a multi-layered information recording medium 10 is set in the information recording apparatus 20, and when the CPU 40 receives a recording request from the host apparatus 15 via the interface 38, the CPU 40 generates a control signal for controlling the rotation of the spindle motor 22 so as to be suitable for the rotation of the recording layer L0, based on the wobble signal from the signal processing circuit 28. To be more precise, a wobble signal is generated by the wobble signal detection circuit 28c, using the signal detected by the I/V amplifier 28a of the signal processing circuit 28, and the unique information of the multi-layered information recording medium 10 is decoded by the decoder 28e. Based on the decoded information, the CPU 40 outputs the generated control signal to the spindle motor (SP motor) control circuit 26c of the control circuit 26, and at the same time, the CPU 40 reports the receipt of the recording request from the host apparatus 15 to the signal processing circuit 28. The reported information is processed at the RF signal detection circuit 28d. When the rotational speed of the multi-layered information recording medium produces a prescribed linear velocity, the recording/reproducing operations described above are performed.

Because in the multi-layered information recording medium of this embodiment the track pitch and the minimum mark length become less dense as the associated recording layer is further separated from the position (at disk distance R0) of the recording layer of the signal-layer information recording medium, the recording capacity of the recording layer decreases along with the increased separation. However, by performing data recording starting from the recording layer with the disk thickness closest to R0, a large amount of data recording can be realized with less inter-layer jumping. In addition, because the minimum mark length differs among the recording layers, the spindle rotational speed has to be determined so as to be suitable for the minimum mark length of the associated recording layer.

If the disk thicknesses of the recording layers are R0, R1, . . . , Rn, and if the spindle rotational speeds of the respective recording layers are A0, A1, . . . , An (where n is a natural number), then the spindle rotational speeds satisfy the relationship $$A0<A1<\ldots<An. \tag{24}$$

If a double-layer information recording medium is used, then, the relationship $$A0<A1 \tag{25}$$

is to be satisfied.

The above-described structure is only an example, and at least a portion of the structure realized by execution of the program by the CPU 40 may be realized by a hardware structure.

Once the spindle rotational speed reaches a physically acceptable value, the optimum recording control may be performed by setting an appropriate pulse duration for each of the recording layers, in place of controlling the spindle rotational speed.

In this case, if the disk thicknesses of the recording layers are R0, R1, . . . , Rn, and if the pulse durations of the respective recording layers are TA0, T1, . . . , Tn (where n is a natural number), then the pulse durations satisfy the relationship $$T0<T1<\ldots<Tn. \tag{26}$$

If a double-layer information recording medium is used, then, the relationship $$T0<T1 \tag{27}$$

is to be satisfied.

In the recording operation for a spiral-type multi-layered information medium, the information recording apparatus often uses a differential push-pull method for track control. In the differential push-pull method, three beams are used to form a main spot and two sub-spots, as illustrated in FIG. 14, and the push-pull signals acquired from the three beams are calculated so as to obtain a tracking signal that has little offset even if misalignment of the optical axis has occurred.

This arrangement is applicable not only to the operations performed under the conditions shown in Table 3, but also data recording and reproducing performed using an optical system having a wavelength of 400 nm to 420 nm and with an objective lens with a NA value of 0.63 to 0.67.

As has been described above, by applying the present invention to multi-layered DVD-ROM, DVD+R, and other medium, time required for inter-layer jumping can be reduced. The invention is also suitably applied to a multi-layered information recording medium that requires signal processing so as to achieve the substantially the same signal quality at each of the recording layers as that of the single-layer information recording medium. The invention is also applicable to an information recording apparatus and an information reproducing apparatus capable of recording and reproducing data in and from the above-described multi-layered information recording medium.

What is claimed is:
1. A multi-layered information recording medium used in an information recording/reproducing apparatus applicable to both a single-layer information recording medium having a single recording layer on one side of that medium and an arbitrary multi-layered information recording medium having two or more recording layers on one side of that medium, the multi-layered information recording medium comprising:
a plurality of recording layers, each recording layer having a guiding groove formed at a track pitch defined by a quadratic function of disk thickness of the associated recording layer;
wherein the plural recording layers include a reference recording layer that has a disk thickness closest to that of the single-layer information recording medium, and the track pitch of the guiding groove of the reference recording layer is the smallest amongst the plural recording layers.

2. The multi-layered information recording medium according to claim 1,
wherein if the multi-layered information recording medium is processed using an optical system having a wavelength of 400 nm to 420 nm and an objective lens with a NA value of 0.63 to 0.67 is used for data recording and reproducing, then the track pitch Pi of each of the recording layers satisfies $1.9 \times 10^{-5} \times (di-600)^2 + 0.45 \leq Pi$, where di denotes the disk thickness of each of the recording layers.

3. The multi-layered information recording medium according to claim 1, wherein the guiding groove of each of the recording layers is a spiral groove, and wherein the track pitch of the spiral groove is determined such that the track pitch increases as the separation of the associated recording layer from the reference recording layer increases.

4. The multi-layered information recording medium according to claim 1,
wherein the track pitches TPm and TPn of respective two adjacent m-th and n-th recording layers satisfy $|(TPm-TPn)/TPm| \geq 0.043$.

5. The multi-layered information recording medium according to any one of claims 1 through 4, wherein the track pitch of the guiding groove formed in each of the recording layers is set so as to achieve an optical resolution equivalent to the optical resolution or a modulation transfer function of a light spot in a radial direction of the recording layer of the single-layer information recording medium.

6. A multi-layered information recording medium used in an information recording/reproducing apparatus applicable to both a single-layer information recording medium having a single recording layer on one side of that medium and an arbitrary multi-layered information recording medium having two or more recording layers on one side of that medium, the multi-layered information recording medium comprising:
a plurality of recording layers, each recording layer having a guiding groove and recording marks formed in the guiding groove wherein said recording marks have a minimum mark length that is a quadratic function of a disk thickness of the associated recording layer;
wherein the plural recording layers include a reference recording layer that has the disk thickness closest to that of the single-layer information recording medium, and the minimum mark length of the recording marks of the reference recording layer is the smallest amongst the plural recording layers.

7. The multi-layered information recording medium according to claim 6,
wherein if the multi-layered information recording medium is processed in an optical system having a wavelength of 400 nm to 420 nm and with an objective lens with a NA value of 0.63 to 0.67, then the minimum mark length Si of each of the recording layers satisfies $1.14 \times 10^{-5} \times (di-600)^2 + 0.24 \leq Si$, where di denotes the disk thickness of each of the recording layers.

8. The multi-layered information recording medium according to claim 6, wherein the guiding groove of each of the recording layers is a spiral groove, and the recording marks are formed in the spiral groove of the associated recording layer in such a manner that the minimum mark length increases as the separation of the associated recording layer from the reference recording layer increases.

9. The multi-layered information recording medium according to claim 6,
wherein the minimum mark lengths Dm and Dn of respective two adjacent m-th and n-th recording layers satisfy $|(Dm-Dn)/Dm| \geq 0.048$.

10. The multi-layered information recording medium according to any one of claims 6 through 9, wherein the recording marks formed in each of the recording layers have the minimum mark length determined so as to achieve an optical resolution equivalent to the optical resolution or a modulation transfer function of a light spot in a data-writing direction of the recording layer of the single-layer information recording medium.

11. A multi-layered information recording medium used in an information recording/reproducing apparatus applicable to both a single-layer information recording medium having a single recording layer on one side of that medium and an arbitrary multi-layered information recording medium having two or more recording layers on one side of that medium, the multi-layered information recording medium comprising:
multiple recording layers, each of the recording layers having a guiding groove and recording marks formed in the guiding groove, the guiding groove having a track pitch determined by a quadratic function of the disk thickness of the associated recording layer, and recording marks having a minimum mark length determined by a quadratic function of the disk thickness of the associated recording layer;
wherein the multiple recording layers include a reference layer that has a disk thickness closest to that of the single-layer information recording medium, and the track pitch of the guiding groove and the minimum mark length of the recording marks of the reference recording layer are the smallest amongst the multiple recording layers.

12. The multi-layered recording medium according to claim 11, wherein:
the guiding groove of each of the recording layers has a track pitch determined so as to achieve an optical resolution equivalent to the optical resolution or a modulation transfer function of a light spot in a radial direction of the recording layer of the single-layer information recording medium, and
the recording marks of each of the recording layers has a minimum mark length determined so as to achieve an optical resolution equivalent to the optical resolution or the modulation transfer function of the light spot in a tangential direction of the recording layer of the single-layer information recording medium.

13. The multi-layered information recording medium according to claim 11, wherein the guiding groove of each of the recording layers is a spiral groove, and the track pitch of the spiral groove increases as the separation of the associated recording layer from the reference recording layer increases.

14. The multi-layered information recording medium according to claim 11, wherein the guiding groove of each of the recording layers is a spiral groove, and the minimum mark length of the recording marks formed in the spiral groove increases as the separation of the associated recording layer from the reference layer increases.

15. The multi-layered information recording medium according to claim 1, 6 or 11, wherein the reference recording layer has the disk thickness equal to that of the single-layer information recording medium.

16. The multi-layered information recording medium according to claim 1 or 11,
wherein the guiding groove of each of the recording layers has a wobble representing unique information, and the guiding groove of each of the recording layers is wobbled such that a ratio of the track pitch of the associated recording layer to a wobble displacement is equal to a ratio of the track pitch of the single-layer information recording medium to a wobble displacement of the single-layer information recording medium.

17. The multi-layered information recording medium according to claim 6 or 11,
wherein the guiding groove of each of the recording layers has a wobble representing unique information, and the guiding groove of each of the recording layers is wobbled such that a ratio of the minimum mark length of the associated recording layer to a wobble frequency is equal to a ratio of the minimum mark length of the single-layer information recording medium to a wobble frequency of the single-layer information recording medium.

18. The multi-layered information recording medium according to claim 1 or 11, wherein the information about the track pitch of each of the recording layers is represented by a wobble of the guiding groove, or wherein each of the recording layers has an area for recording the information about the track pitch.

19. The multi-layered information recording medium according to claim 1 or 11, wherein information about the track pitches of the recording layers is represented by a wobble of the guiding groove of each of the recording layers, or wherein each of the recording layers has an area for writing the information about the track pitches of the recording layers.

20. The multi-layered information recording medium according to claim 6 or 11, wherein information about the minimum mark length of each of the recording layers is represented by a wobble of the guiding groove, or wherein each of the recording layers has an area for writing the information about the minimum mark length.

21. The multi-layered information recording medium according to claim 6 or 11, wherein information about the minimum mark lengths of the recording layers is represented by a wobble of the guiding groove of each of the recording layers, or wherein each of the recording layers has an area for recording the information about the minimum mark lengths of the recording layers.

22. An information recording apparatus operative for both a single-layer information recording medium having a single recording layer on one side of the medium and a multi-layered information recording medium having multiple recording layers on one side of the medium, the apparatus comprising:
a pickup device configured to read data about a currently processed recording layer from the recording medium; and
a writing unit configured to write information in a multi-layered information recording medium by forming recording marks in each of multiple recording layers of the multi-layered information recording medium wherein said recording marks formed in each of the recording layers have a minimum mark length that is a quadratic function of a disk thickness of the associated recording layer, wherein the multiple recording layers include a reference recording layer having a disk thickness closest to that of the single-layer information recording medium, and the recording mark having a minimum mark length formed in the reference layer becomes the smallest amongst the multiple recording layers of the multi-layered information recording medium.

23. The information recording apparatus according to claim 22, further comprising:
a controller configured to increase a rotational speed of the multi-layered information recording medium during the recording operation as separation of the currently processed recording layer from the reference recording layer becomes greater based upon the data read by the pickup device.

24. The information recording apparatus according to claim 22, further comprising:
a controller configured to increase a time duration of a recording pulse during the recording operation as separation of the currently processed recording layer from the reference recording layer becomes greater based upon the data read by the pickup device.

25. The information recording apparatus for recording information in the multi-layered information recording medium defined in any one of claim 1-4, 6-9, or 11-14, comprising:
a pickup device configured to read data about a currently processed recording layer from the multi-layered information recording medium;
a writing unit configured to write information in a multi-layered information recording medium by forming recording marks in each of multiple recording layers; and
a controller configured to increase a rotational speed of the multi-layered information recording medium as separation of the currently processed recording layer from the reference recording layer having the disk thickness closest to that of the single-layer information recording medium become greater, based upon the data read by the pickup device.

26. An information recording apparatus for recording information in the multi-layered information recording medium defined in any one of claim 1-4, 6-9, or 11-14, comprising:
a pickup device configured to read data about a currently processed recording layer from the multi-layered information recording medium;
a writing unit configured to write information in a multi-layered information recording medium by forming recording marks in each of multiple recording layers; and
a controller configured to increase a time duration of a recording pulse for recording the information in the multi-layered information recording medium as separation of the currently processed recording layer from the reference recording layer having the disk thickness closest to that of the single-layer information recording medium become greater, based upon the data read by the pickup device.

27. The information recording apparatus according to claim 25, configured to write information starting from the reference layer having the disk thickness closest to that of the single-layer information recording medium.

28. An information reproducing apparatus for reproducing information from the multi-layered information recording medium defined in claim 1, comprising:
an optical system configured to produce a main beam and a sub-beam;
a pickup device configured to read data about a currently reproduced recording layer from the multi-layered information recording medium; and a controller configured to perform track control using a differential push-pull method using the main beam and the sub-beam, the controller changing a gain ratio of a push-pull signal generated by the sub-beam according to the track pitch of the guiding groove of each of the recording layers during the track control.

29. The information recording apparatus according to claim 26, configured to write information starting from the reference layer having the disk thickness closest to that of the single-layer information recording medium.

30. An information reproducing apparatus for reproducing information from the multi-layered information recording medium defined in claim 11, comprising:

an optical system configured to produce a main beam and a sub-beam;

a pickup device configured to read data about a currently reproduced recording layer from the multi-layered information recording medium; and a controller configured to perform track control using a differential push-pull method using the main beam and the sub-beam, the controller changing a gain ratio of a push-pull signal generated by the sub-beam according to the track pitch of the guiding groove of each of the recording layers during the track control.

* * * * *